United States Patent
Viegas et al.

(10) Patent No.: US 11,410,223 B2
(45) Date of Patent: Aug. 9, 2022

(54) METHOD AND SYSTEM FOR FACILITATING E-COMMERCE TRANSACTIONS

(71) Applicant: MASTERCARD INTERNATIONAL INCORPORATED, Purchase, NY (US)

(72) Inventors: Rukuma Viegas, Pune (IN); Rajesh Pralhadrao Mahalle, Pune (IN); Arunmurthy Gurunathan, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 96 days.

(21) Appl. No.: 16/420,886

(22) Filed: May 23, 2019

(65) Prior Publication Data
US 2019/0362414 A1 Nov. 28, 2019

(30) Foreign Application Priority Data
May 24, 2018 (SG) .......................... 10201804424W

(51) Int. Cl.
*G06Q 30/06* (2012.01)
*G06Q 20/12* (2012.01)

(52) U.S. Cl.
CPC ......... *G06Q 30/0641* (2013.01); *G06Q 20/12* (2013.01)

(58) Field of Classification Search
CPC ................ G06Q 30/0601–0645; G06Q 20/12
See application file for complete search history.

(56) References Cited

U.S. PATENT DOCUMENTS 8,280,787 B1 * 10/2012 Gandhi .................. G06Q 40/02
705/30
9,799,059 B1 * 10/2017 Curtis ................ G06Q 30/0283
(Continued)

FOREIGN PATENT DOCUMENTS

CN 104094301 A 10/2014
CN 107369011 A * 11/2017 ............. G06Q 20/20
(Continued)

OTHER PUBLICATIONS

Perez, Sarah. Amazon Quietly Launches Its Consumer-Facing Mobile Wallet App, Amazon Wallet. Jul. 22, 2014.*
(Continued)

*Primary Examiner* — Mark A Fadok
(74) *Attorney, Agent, or Firm* — Talem IP Law, LLP

(57) ABSTRACT

A method for facilitating e-commerce transactions includes monitoring a purchase pattern of a user on various e-commerce interfaces for a first time-interval by a bot. The purchase pattern indicates frequency-of-use information of various payment options used by the user to make purchases within the first time-interval. The bot receives a user-profile of the user, when the user makes a first purchase through a first e-commerce interface after the first time-interval. Based on the user-profile and the purchase pattern, the bot retrieves a first set of payment options from the payment options. The bot customizes a payment interface to display the first set of payment options from an available set of payment options on the payment interface. The user selects one of the first set of payment options to perform an e-commerce transaction for the first purchase.

20 Claims, 18 Drawing Sheets

(56) References Cited

U.S. PATENT DOCUMENTS

| | | | | |
|---|---|---|---|---|
| 10,332,079 B2* | 6/2019 | Van Os | | G06Q 20/36 |
| 2008/0033839 A1* | 2/2008 | Tarvydas | | G06Q 30/0641 |
| | | | | 705/26.35 |
| 2011/0029367 A1* | 2/2011 | Olson | | G06Q 30/0224 |
| | | | | 705/14.25 |
| 2012/0197691 A1* | 8/2012 | Grigg | | G06Q 20/3278 |
| | | | | 705/14.1 |
| 2012/0284177 A1* | 11/2012 | Mukherjee | | G06Q 20/227 |
| | | | | 705/40 |
| 2013/0339234 A1* | 12/2013 | Prakash | | G06Q 20/12 |
| | | | | 705/41 |
| 2014/0006129 A1 | 1/2014 | Heath | | |
| 2014/0244514 A1* | 8/2014 | Rodriguez | | G06Q 20/3223 |
| | | | | 705/71 |
| 2014/0258083 A1* | 9/2014 | Achanta | | G06Q 40/025 |
| | | | | 705/38 |
| 2014/0279509 A1* | 9/2014 | Khilnani | | G06Q 20/12 |
| | | | | 705/44 |
| 2015/0254636 A1* | 9/2015 | Yoon | | G06Q 20/3278 |
| | | | | 705/44 |
| 2016/0232600 A1* | 8/2016 | Purves | | G06Q 20/3223 |
| 2016/0260086 A1* | 9/2016 | Cho | | G06Q 20/322 |
| 2016/0371673 A1* | 12/2016 | Eramian | | G06Q 20/322 |
| 2017/0024724 A1* | 1/2017 | Kwak | | G06Q 20/227 |
| 2017/0116601 A1* | 4/2017 | Lore | | G06Q 20/42 |
| 2018/0005215 A1* | 1/2018 | Delaney | | G06Q 20/4016 |
| 2019/0180385 A1* | 6/2019 | Stoddard | | G06Q 40/125 |
| 2021/0027357 A1* | 1/2021 | Bonfigli | | G06Q 30/0627 |

FOREIGN PATENT DOCUMENTS

| | | | | |
|---|---|---|---|---|
| CN | 108734460 A | * | 11/2018 | G06Q 30/0631 |
| EP | 2838060 A1 | * | 2/2015 | G06Q 20/384 |
| KR | 20150094580 A | * | 8/2015 | |

OTHER PUBLICATIONS

Skrill, "Skrill Quick Checkout Integration Guide", Skrill.com, dated: Feb. 15, 2014. (Year: 2014).*

Office Action Issued in Indian Patent Application No. 201914009991, dated Mar. 23, 2021, 8 Pages.

* cited by examiner

| Payment Category 224A | Payment Option 224B | Payment Interface 224C | Frequency-of-use 224D |
|---|---|---|---|
| Transaction Cards | First Transaction Card | First Merchant Website | 25 |
| | | Second Merchant Website | 24 |
| | | Second Merchant Application | 34 |
| | Second Transaction Card | First Merchant Application | 15 |
| | | First Merchant Website | 20 |
| E-wallets | First e-wallet | First Merchant Application | 5 |
| | | First Merchant Website | 10 |
| Net-banking | First Account | Second Merchant Application | 25 |

FIG. 2C

| Payment Category 228A | Payment Option 228B | Payment Interface 228C | Information 228D | |
|---|---|---|---|---|
| Transaction Cards | First Transaction Card | First Merchant Website | User Device 1 | xxx.xx.xxx.234 |
| | | | User Device 2 | xxx.xx.xxx.567 |
| | | Second Merchant Website | User Device 1 | xxx.xx.xxx.234 |
| | | | User Device 2 | xxx.xx.xxx.567 |
| | | | User Device 3 | xxx.xx.xxx.867 |
| | Second Transaction Card | Second Merchant Application | User Device 1 | xxx.xx.xxx.234 |
| | | | User Device 2 | xxx.xx.xxx.567 |
| E-wallets | First e-wallet | First Merchant Application | User Device 1 | xxx.xx.xxx.234 |
| | | First Merchant Website | User device 1 | xxx.xx.xxx.234 |
| | | | User Device 2 | xxx.xx.xxx.567 |
| | | First Merchant Application | User Device 1 | xxx.xx.xxx.234 |
| | | First Merchant Website | User Device 1 | xxx.xx.xxx.234 |
| Net-banking | First Account | Second Merchant Application | User Device 1 | xxx.xx.xxx.234 |

FIG. 2E

| Payment Category 230A | Payment Option 230B | Payment Interface 230C | Spend Range 230D |
|---|---|---|---|
| Transaction Cards | First Transaction Card | First Merchant Website | $200 - $1,000 |
| | | Second Merchant Website | $0 - $500 |
| | | Second Merchant Application | $100 - $800 |
| | Second Transaction Card | First Merchant Application | $100 - $1,500 |
| | | First Merchant Website | $50 - $400 |
| E-wallets | First e-wallet | First Merchant Application | $10 - $100 |
| | | First Merchant Website | $20 - $200 |
| Net-banking | First Account | Second Merchant Application | $200 - $5,000 |

FIG. 2F

| Payment Category 232A | Payment Option 232B | Payment Interface 232C | | Real-time Location 232D |
|---|---|---|---|---|
| Transaction Cards | First Transaction Card | First Merchant Website | User Device 1 | Location 1, Location 2, and Location 3 |
| | | | User Device 2 | Location 1 and Location 3 |
| | | Second Merchant Website | User Device 1 | Location 1 and Location 2 |
| | | | User Device 2 | Location 1 and Location 3 |
| | | | User Device 3 | Location 3 |
| | Second Transaction Card | Second Merchant Application | User Device 1 | Location 2 and Location 3 |
| | | | User Device 2 | Location 1 and Location 3 |
| | | First Merchant Application | User Device 1 | Location 1 and Location 2 |
| E-wallets | First e-wallet | First Merchant Website | User device 1 | Location 1 and Location 3 |
| | | First Merchant Application | User Device 2 | Location 2 |
| | | First Merchant Website | User Device 1 | Location 1 |
| Net-banking | First Account | First Merchant Website | User Device 1 | Location 3 |
| | | Second Merchant Application | User Device 1 | Location 2 |

METHOD AND SYSTEM FOR FACILITATING E-COMMERCE TRANSACTIONS

TECHNICAL FIELD

The present invention relates to electronic transactions, and more particularly to a method and a system for facilitating e-commerce transactions.

BACKGROUND

Proliferation of the internet has led to an emergence of e-commerce as a one-stop solution for shopping. After the introduction of smartphones and advent of continuous internet connectivity, e-commerce has become even more popular. E-commerce interfaces, such as e-commerce websites and e-commerce mobile applications, offer a wide catalog of products at the best available prices to customers. Therefore, the customers these days prefer such e-commerce interfaces over brick and mortar stores for purchasing products of their choice. In addition to reducing physical efforts, the e-commerce interfaces also minimize time that the customers have to spend on shopping.

These e-commerce interfaces are usually linked to corresponding payment gateways that enable the customers to perform e-commerce transactions for purchasing the products. A payment gateway typically presents a payment interface to a customer for performing an e-commerce transaction, when the customer wishes to purchase a product. The payment interfaces offer a wide array of payment categories, such as net-banking, transaction cards, cash-on-delivery, e-wallets, and the like, to the customer for performing the e-commerce transaction. Each payment category has various payment options listed under it. For example, a net-banking category lists all available issuer banks as payment options to the customer. The customer usually scans through the listed payment options of the selected category to select a relevant payment option.

Typically, from all the listed payment categories and options, only a few categories and options are relevant to the customer. Hence, it is very inconvenient for the customer to scan through the entire list of payment categories and options for the selection of a relevant payment category and option. In some scenarios, the customer is required to save some confidential information at the payment interface for certain payment categories, such as transaction cards, cash-on-delivery, e-wallets, or the like. For example, the customer is required to save debit or credit card details of her debit or credit cards at the payment interface, if she chooses to perform the e-commerce transaction by using the transaction card category. In another example, the customer may be required to save e-wallet details of her e-wallet at the payment interface, if she chooses to perform the e-commerce transaction by using the e-wallet category. The information saved at the payment interface may not be secure, and hence is a matter of concern for the customer. In addition, the customer is required to save the information at every payment interface that she uses for purchasing products, which in turn requires a lot of time and hence degrades the shopping experience of the customer.

In light of the foregoing, there exists a need for a solution that eliminates a requirement to save confidential information of customers at e-commerce interfaces and improves shopping experience of the customers by presenting a simple and de-cluttered relevant payment interface.

BRIEF SUMMARY

In an embodiment of the present invention, a method for facilitating e-commerce transactions is provided. A purchase pattern of a user on one or more e-commerce interfaces is monitored by a bot that is implemented on a processor. The bot monitors the purchase pattern for a first time-interval. The purchase pattern includes frequency-of-use information of one or more payment options used by the user to make one or more purchases on the one or more e-commerce interfaces within the first time-interval. The user-profile of the user is received by the bot from a first e-commerce interface of the one or more e-commerce interfaces, when the user makes a first purchase through the first e-commerce interface after the first time-interval. A first set of payment options is retrieved from the one or more payment options by the bot, based on the user-profile and the purchase pattern. A payment interface is customized by the bot to display the first set of payment options from an available set of payment options on the payment interface. The first set of payment options displayed on the payment interface is selectable by the user to perform an e-commerce transaction for the first purchase.

In another embodiment of the present invention, a system for facilitating e-commerce transactions is provided. The system includes a payment-gateway processor having a bot implemented thereon. The bot monitors a purchase pattern of a user on one or more e-commerce interfaces for a first time-interval. The purchase pattern comprises frequency-of-use information of one or more payment options used by the user to make one or more purchases on the one or more e-commerce interfaces within the first time-interval. The bot receives a user-profile of the user from a first e-commerce interface of the one or more e-commerce interfaces, when the user makes a first purchase through the e-first commerce interface after the first time-interval. The bot retrieves a first set of payment options from the one or more payment options, based on the user-profile and the purchase pattern. The bot customizes a payment interface to display the first set of payment options from an available set of payment options on the payment interface. The first set of payment options displayed on the payment interface is selectable by the user to perform an e-commerce transaction for the first purchase.

In yet another embodiment of the present invention, a method for facilitating e-commerce transactions is provided. A default payment interface is presented by a processor on a device of a user for a first time-interval. The default payment interface enables the user to perform one or more e-commerce transactions for making one or more purchases from one or more e-commerce interfaces. The user uses one or more payment options from an available set of payment options on the default payment interface for performing the one or more e-commerce transactions. A purchase pattern of the user is monitored on the one or more e-commerce interfaces by a bot implemented on the processor. The bot monitors the purchase pattern for a first time-interval, based on the one or more e-commerce transactions. The purchase pattern includes frequency-of-use information of the one or more payment options. A user-profile of the user is received by the bot from a first e-commerce interface of the one or more e-commerce interfaces, when the user makes a first purchase through the first e-commerce interface after the first time-interval. A first set of payment options is identified by the bot from the one or more payment options based on the user-profile and the purchase pattern. The first set of payment options is retrieved from a database server. The default payment interface is customized by the bot to display the first set of payment options. The bot excludes a second set of payment options from the available set of payment options for displaying the first set of payment options. The first set of payment options displayed on the default payment interface is selectable by the user to perform an e-commerce transaction for the first purchase.

BRIEF DESCRIPTION OF THE DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present invention are illustrated by way of example, and not limited by the appended figures, in which like references indicate similar elements:

FIGS. 2C-2G are block diagrams that illustrate information included in the purchase pattern of FIG. 2B, in accordance with an embodiment of the present invention;

Figure 1:
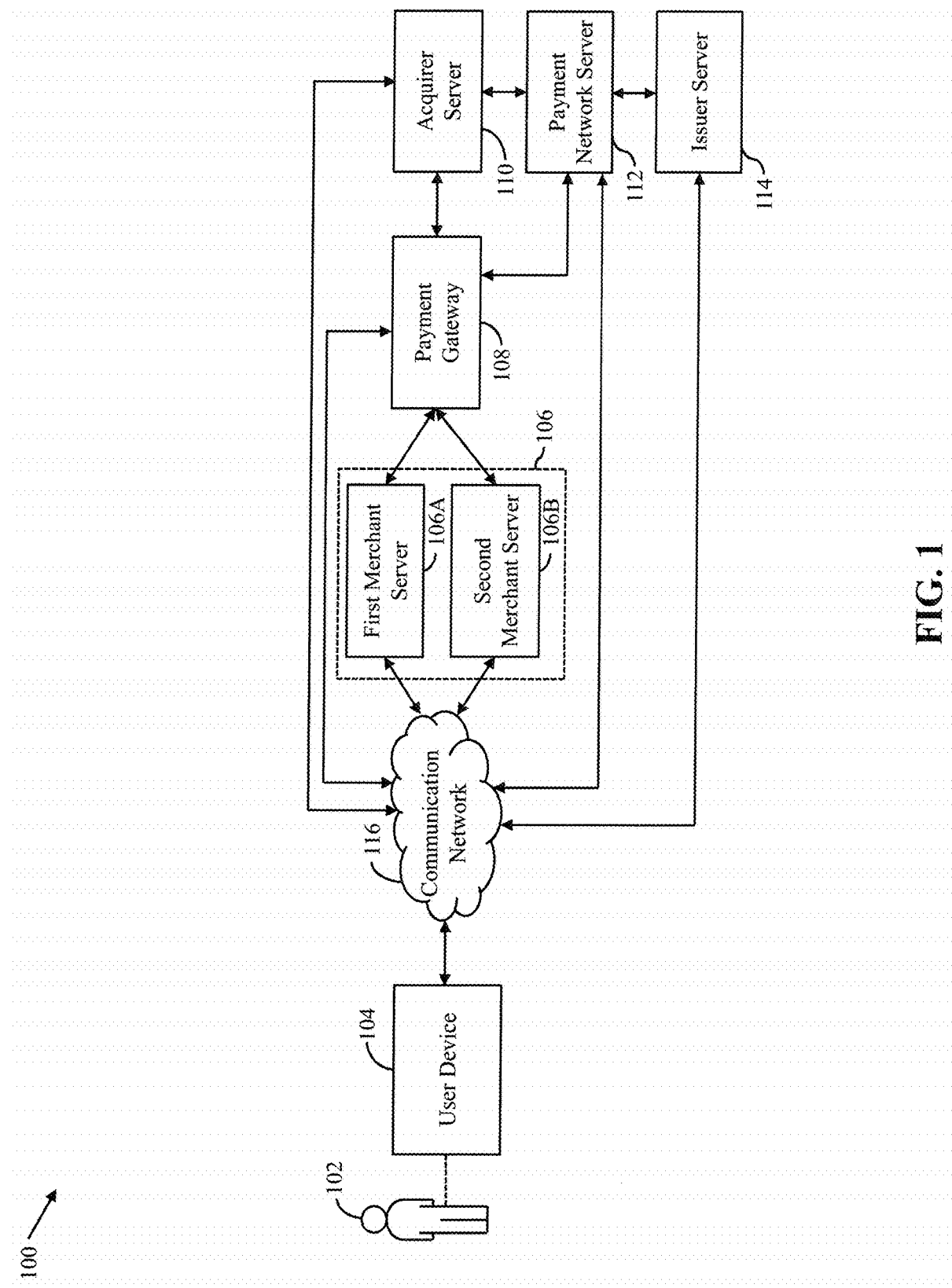
FIG. 1 is a block diagram that illustrates a communication environment for facilitating e-commerce transactions, in accordance with an embodiment of the present invention.

Further areas of applicability of the present invention will become apparent from the detailed description provided hereinafter. It should be understood that the detailed description of exemplary embodiments is intended for illustration purposes only and is, therefore, not intended to necessarily limit the scope of the invention.

DETAILED DESCRIPTION

The present invention is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

Various embodiments of the present invention provide method and system for facilitating e-commerce transactions. A user may log into an e-commerce interface (such as an e-commerce mobile application or an e-commerce website) of a merchant by providing her login credentials, such as a user identifier (ID) and a password. The e-commerce interface maintains a user-profile of the user, which includes user details and purchase history of the user.

When the user selects to make a payment for purchasing a product, the e-commerce interface re-directs the control to a payment gateway that is implemented by a payment-gateway processor of a server. Examples of the server include a payment network server, an acquirer server, an issuer server, a merchant server, a third-party payment gateway server, or the like. The e-commerce interface further provides the user-profile of the user to the payment-gateway processor. The payment-gateway processor further includes a bot implemented thereon. The bot is implemented by way of an artificial intelligent algorithm, such as Python®, Java®, artificial neural networks, or the like.

When the bot determines that the user has made the purchase within a first time-interval, the payment-gateway processor presents a default payment interface including an available set of payment categories and options to the user to perform a transaction for the purchase. The user may select a payment category from the available set of payment categories and a payment option from the available set of payment options that falls under the selected payment category to perform the transaction. Based on the payment option selected by the user and the user-profile, the bot monitors a purchase pattern of the user. The purchase pattern includes information associated with the payment option used by the user for performing the transaction. The purchase pattern further includes information of various e-wallets that are linked to the contact number of the user, device information of a user device, spend-range information, real-time location of the user, and frequency-of-use information of the payment option. The bot stores the monitored purchase pattern in encrypted format in a database. For every other e-commerce transaction that the user performs within the first time-interval, the bot updates the purchase pattern.

When the user wishes to perform a transaction after the first time-interval, the bot identifies a first set of payment categories and options from various payment categories and options used by the user to perform transactions during the first time-interval. The bot identifies the first set of payment categories and options based on the purchase pattern and the user-profile of the user. The bot then customizes the default payment interface to present the identified first set of payment categories and options to the user. Thus, the customized payment interface includes the first set of payment categories and options instead of all the available set of payment categories and options. In other words, the bot excludes a second set of payment categories and options from the available set of payment categories and options to customize the default payment interface.

Since the bot customizes the default payment interface based on the purchase pattern and the user-profile of the user, the customized payment interface is de-cluttered and includes only those payment categories and options that are relevant to the user. Hence, the user is saved from the hassle of scanning all the payment categories and options of the default payment interface to select relevant payment category and option. The purchase pattern is stored in an encrypted format for ensuring data security to the user. In addition to data security, the bot eliminates the requirement to save confidential information of various payment options at every e-commerce interface. This is because the bot retrieves the purchase pattern including the information of various payment options relevant to the user, when the user wishes to perform any transaction. In other words, the bot improves the shopping experience of the user by eliminating information of payment categories and options that are not relevant to the user.

Terms Description (In Addition to Plain and Dictionary Meaning)

E-commerce interface is a graphical user interface (GUI) that enables a user to do shop online for various products and services offered by a merchant. The e-commerce interface presents to the user a variety of products and services that are listed for sale. The e-commerce interface may be an e-commerce mobile application installed on a user device of the user or an e-commerce website that the user accesses through a web browser installed on the user device.

Payment option is a mode of payment for facilitating e-commerce transactions. Examples of payment options include transaction cards (such as debit and credit cards), bank accounts, e-wallets, reward points, vouchers, and cash-on-delivery payments, or the like.

Default payment interface is a payment interface which is not customized for any user. Hence the default payment interface is same for all users. The default payment interface presents an available set of payment categories and options to the users for performing e-commerce transactions. Examples of payment categories include net-banking category, transaction card category, e-wallets category, reward points category, cash-on-delivery category, or the like. The available set of payment categories include all payment categories that are available for e-commerce transactions. Each payment category in the available set of payment categories has the available set of payment options listed under it. For example, the net-banking category lists all issuer banks as payment options. The e-wallets category lists all available e-wallets as payment options. The user may choose any payment category from the available set of payment categories and any payment option corresponding to the selected payment category for performing e-commerce transactions.

Purchase pattern of a user indicates a pattern of use for various payment categories and options over a first time-interval. The purchase pattern includes information of the payment categories and options used by the user to perform e-commerce transactions during a first time-interval. The purchase pattern further includes details of various e-wallets of the user, device information of various devices used by the user to perform the e-commerce transactions during the first time-interval, spend-range information of the user corresponding to the e-commerce transactions, and frequency-of-use information of each payment category and option used by the user to perform the e-commerce transactions during the first time-interval.

First time-interval is a time period for which a purchase pattern of a user is monitored. The first time-interval may be based on a shopping frequency of the user. For example, a first user, who shops more frequently than a second user, is likely to have a shorter first time-interval than the second user. Alternatively, the first time-period may be a function of number of purchases performed by a user; for example, the time required for a predetermined number of purchases, such as five purchases, ten purchases, etc.

Bot is a virtual tool that runs automated tasks based on artificial intelligence. The bot monitors a purchase pattern of a user for various e-commerce transactions that the user performs during the first time-interval. Based on the monitored purchase pattern and a user-profile of the user, the bot customizes a default payment interface to exclude the payment categories and options that are not relevant to the user.

Frequency-of-use of a payment category or option indicates a count of times a payment category or option is chosen by a user to perform e-commerce transactions. For example, if user uses a first transaction card to perform five e-commerce transactions, the frequency-of-use for the first transaction card is five.

Transaction cards are payment devices, such as debit cards, credit cards, prepaid cards, promotional cards, contactless cards, and/or other devices that may hold identification information of a user account. The transaction cards can be used to perform transactions, such as deposits and withdrawals, credit transfers, purchase payments, and the like. In an embodiment, the transaction cards may be radio frequency identification (RFID) or near field communication (NFC) enabled for performing contactless payments.

Merchant is an entity that offers various products and/or services in exchange for payments. The merchant may establish a merchant account with a financial institution, such as a bank ("acquirer bank") to accept the payments from several users by use of one or more payment methods.

Issuer or issuer bank is a financial institution, such as a bank, where accounts of several users are established and maintained. The issuer bank ensures payments for authorized transactions in accordance with various payment network regulations and local legislation.

Payment network is a transaction card association that acts as an intermediate entity between acquirer banks and issuer banks to authorize and fund transactions. Examples of payment networks include MasterCard®, American Express®, VISA®, Discover®, Diners Club®, and the like. The payment network settles the transactions between various acquirer banks and issuer banks, when transaction cards are used for initiating transactions. For example, if a user uses a stolen debit card for performing a transaction, the payment network does not authorize the transaction. In one embodiment, the payment network offers a payment gateway service to facilitate e-commerce transactions.

A server is a physical or cloud data processing system on which a server program runs. The server may be implemented in hardware or software, or a combination thereof. In one embodiment, the server may be implemented in computer programs executing on programmable computers, such as personal computers, laptops, or a network of computer systems. The server may correspond to one of a payment network server, an issuer server, a merchant server, an acquirer server, or a third-party payment gateway server.

FIG. 1 is a block diagram that illustrates a communication environment 100 for facilitating e-commerce transactions, in accordance with an embodiment of the present invention. The communication environment 100 includes a user 102 in possession of a user device 104. The communication environment 100 further includes first and second merchant servers 106A and 106B (hereinafter collectively referred to as "merchant servers 106"), a payment gateway 108, an acquirer server 110, a payment network server 112, and an issuer server 114. The user device 104 communicates with the merchant servers 106, the payment gateway 108, the acquirer server 110, the payment network server 112, and the issuer server 114 by way of a communication network 116.

The user 102 is an individual, who makes purchases through various e-commerce interfaces. A purchase through an e-commerce interface may include availing a service and/or purchasing a product. In one embodiment, the e-commerce interface is a web site of a merchant. In another embodiment, the e-commerce interface is a mobile application associated with the merchant. The user 102 is an account holder of multiple accounts and possesses various transactions cards linked to the accounts. The accounts are bank accounts maintained by various financial institutions, such as issuer banks. Each account has a unique account number and is associated with a unique customer identifier (ID) known to the user 102. The accounts are further linked to an e-mail ID and a contact number of the user 102. The unique account number, the unique customer ID, the e-mail ID, and the contact number linked to an account corresponds to account identification information of the corresponding account. Each transaction card has a unique card number, an expiry date, a card security code, and a card type associated to it. The card number, the expiry date, the card security code, and the card type of a transaction card constitute credentials of the corresponding transaction card. Examples of the transaction cards include credit card, a debit card, a membership card, a promotional card, a charge card, a prepaid card, or the like. The user 102 further owns multiple e-wallets maintained by third-party e-wallets providers. Each e-wallet is linked to the e-mail ID and the contact number of the user 102. The user 102 may use various payment options available to her for making the purchases. The payment options are one or more options that facilitate e-commerce transactions for the purchases using an account, a transaction card, an e-wallet, reward points, a cashback amount, a voucher, a coupon, a digital currency, and/or the like.

The user device 104 is a communication device of the user 102 that the user 102 uses for making the purchases. In one embodiment, the user 102 may access various e-commerce websites by way of a web-browser installed on the user device 104 for making the purchases. In another embodiment, the user device 104 may have various e-commerce mobile applications of the e-commerce websites installed thereon, using which the user 102 makes the purchases. The web-browser and the e-commerce mobile applications may be installed in a memory (not shown) of the user device 104. The user device 104 has a unique device ID associated therewith; for example, an international mobile equipment identity (IMEI) number, media access control (MAC) address, and/or the like. Examples of the user device 104 include, but are not limited to, a mobile phone, a smartphone, a laptop, a tablet, a phablet, or any other communication device.

The merchant servers 106 are computing servers that are associated with merchants. For example, the first merchant server 106A is associated with a first merchant and the second merchant server 106B is associated with a second merchant. The first and second merchants are two different merchants. The merchants may establish merchant accounts with financial institutions, such as acquirer banks, to accept payments for products and/or services purchased and/or availed by various users. For example, the first and second merchants have first and second merchant accounts, respectively, that are established at an acquirer bank. The first and second merchant servers 106A and 106B host corresponding e-commerce websites and are further linked to corresponding e-commerce mobile applications installed on the user device 104. The first and second merchants may partner with the payment gateway 108 for processing payments of the products and/or services purchased and/or availed by the users, such as the user 102.

The merchant servers 106 maintain a user-profile of each user, who makes purchases from the corresponding e-commerce website or the e-commerce mobile application. The user-profile of a user includes user details and purchase history of the corresponding user. The user details include name, age, gender, physical attributes, a contact number, an alternate contact number, an e-mail ID, or the like of the user. The purchase history of each user represents details of all previous purchases made by the corresponding user. For example, the purchase history of the user 102 maintained by the first merchant server 106A represents details of all previous purchases made by the user 102 from the e-commerce website or the e-commerce mobile application of the first merchant. The details of a purchase made by the user 102 by way of the user device 104 may include a purchase order ID, a purchase amount, a purchase date, the unique device ID, and a unique network address (for example, an internet protocol (IP) address) of the user device 104. The purchase order ID is unique identifier assigned to each purchase. The purchase amount represents the amount the user 102 had paid during the purchase. The purchase date represents the date on which the user 102 made the purchase. The merchant servers 106 update the user-profile of the users based on every purchase made by the users through the corresponding e-commerce mobile application and the e-commerce website. In one embodiment, a user-profile of the user 102 is visible, when the user 102 logs into the corresponding e-commerce website or the e-commerce mobile application. In a scenario when the user 102 selects a product and/or a service for purchasing from the first or second merchant server 106A or 106B and proceeds to pay for the product and/or the service, the first or second merchant server 106A or 106B re-directs a control from the corresponding e-commerce interface (such as the e-commerce mobile application and the e-commerce website) to the payment gateway 108 for facilitating an e-commerce transaction for the purchase.

The payment gateway 108 is an entity that enables the user 102 to perform e-commerce transactions for the products and/or services that are selected by the user 102 for purchase. In one embodiment, the payment gateway 108 serves as a gateway into the acquirer server 110, the payment network server 112, and/or the issuer server 114. The payment gateway 108 presents a payment interface (such as a default payment interface) to the user 102 for performing an e-commerce transaction for the purchase. The default payment interface is a GUI that displays an available set of payment categories to the user 102. The available set of payment categories may include a transaction card category, a net-banking category, a digital currency category, an e-wallet category, an instant pay category, a cash-on-delivery category, or the like. Based on the selection of a payment category from the available set of payment categories by the user 102, an available set of payment options that falls under the selected payment category is displayed to the user 102. The available set of payment options under the net-banking and the e-wallet categories include a list of all issuer banks that offer net-banking facility and a list of all e-wallet service providers that offer e-wallet facility, respectively. The available set of payment options under the transaction card category enables the user 102 to provide credentials of a transaction card that the user 102 wishes to use for performing the e-commerce transaction. The available set of payment options under the digital currency category includes a list one or more types of digital currencies that are in use. The available set of payment options under the cash-on-delivery category enables the user 102 to add an address for the delivery of the product selected by the user 102. In a scenario, when there are multiple payment options in the available set of payment options, the user 102 may select at least one payment option to make the e-commerce transaction. In one embodiment, the payment gateway 108 customizes the payment interface to display a first set of payment categories that is relevant to the user 102. In addition, the payment interface displays a first set of payment options that is relevant to the user 102 instead of all the payment options, when the user 102 selects a payment category from the first set of payment categories. The customization of the payment interface is explained in detail in conjunction with FIGS. 2A and 3.

The acquirer server 110 is a computing server that is associated with the acquirer bank. The acquirer bank processes transaction requests received from the merchant servers 106 by using the acquirer server 110. The acquirer server 110 transmits the transaction requests to payment networks or issuer banks, via the communication network 116. The acquirer server 110 credits or debits the first and second merchant accounts in the acquirer bank based on the transaction requests. The acquirer server 110 transmits and receives various transaction requests and messages that are pursuant to one or more standards for the interchange of transaction messages, such as the ISO8583 standard.

The payment network server 112 is a computing server that is associated with a payment network of various transaction cards. The payment network server 112 represents an intermediate entity between the acquirer server 110 and the issuer server 114 for authorizing and funding the transactions performed by using the transaction cards. In one embodiment, the payment network server 112 further offers a platform to provide multiple services associated with the functioning of the payment gateway 108. For example, the payment network server 112 may host the payment gateway 108 and provide payment processing services to the merchant servers 106. The payment network server 112 may further perform various data management operations for the functioning of the payment gateway 108. Examples of various payment networks include MasterCard, American Express, VISA, Discover, Diners Club, or the like.

Figure 3:
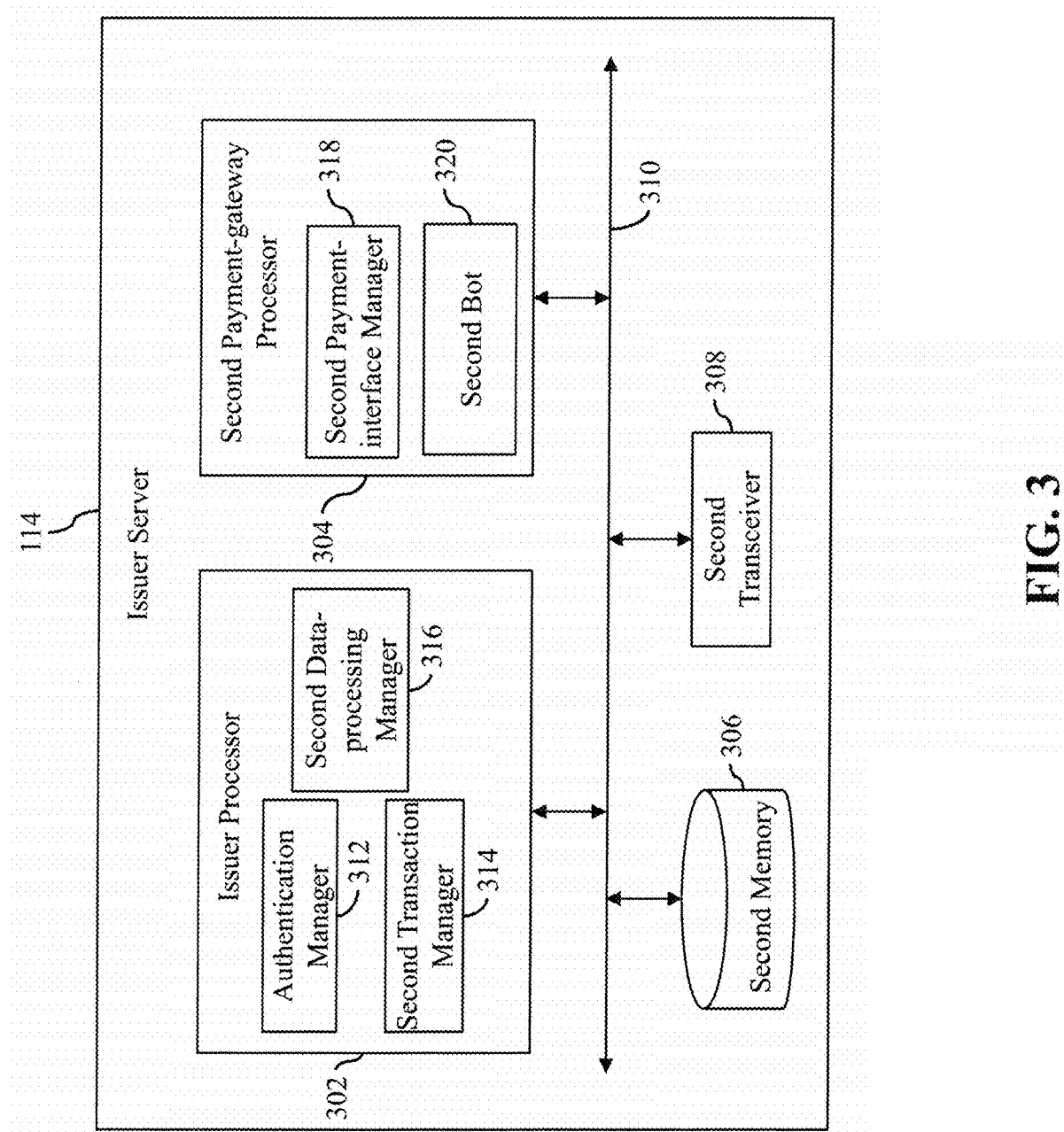
FIG. 3 is a block diagram that illustrates an issuer server of the communication environment of FIG. 1, in accordance with an embodiment of the present invention.

The issuer server 114 is a computing server that is associated with the issuer bank. The issuer bank is a financial institution that manages accounts of multiple users. Account details of the accounts established with the issuer bank are stored as account profiles in a memory (as shown in FIG. 3) of the issuer server 114 or on a cloud server (not shown) associated with the issuer server 114. The account details may include an account balance, a credit line, details of an account holder, transaction history of the account holder, account identification information, credentials of transaction cards linked to the account, or the like. The details of the account holder may include name, age, gender, physical attributes, a registered contact number, an alternate contact number, a registered e-mail ID, or the like of the account holder. The issuer server 114 receives the transaction requests from at least one of the merchant servers 106, the acquirer server 110, and the payment network server 112. Based on the transaction requests, the issuer server 114 credits or debits the corresponding accounts. Methods for crediting and debiting accounts via the issuer server 114 will be apparent to persons having skill in the art and may include processing via the traditional four-party system or the traditional three-party system. In one embodiment, the issuer server 114 may offer a platform to provide multiple services associated with the functioning of the payment gateway 108. For example, the issuer server 114 may host the payment gateway 108 and provide payment processing services to the merchant servers 106. In such a scenario, the issuer server 114 may further perform various data management operations for the functioning of the payment gateway 108.

It will be apparent to a person skilled in the art that the scope of the invention is not limited to realizing the payment gateway 108 as a separate entity as shown in FIG. 1. In various other embodiments, when the merchant servers 106, the payment network server 112, or the issuer server 114 offers payment processing services, the functionalities of the payment gateway 108 can be integrated into the merchant servers 106, the payment network server 112, or the issuer server 114, respectively, without departing from the scope of the invention.

Examples of the merchant servers 106, the payment gateway 108, the acquirer server 110, the payment network server 112, and the issuer server 114 include, but are not limited to, computers, laptops, mini-computers, mainframe computers, any non-transient and tangible machines that can execute a machine-readable code, cloud-based servers, distributed server networks, or a network of computer systems.

The communication network 116 is a medium through which content and messages are transmitted between various entities, such as the user device 104, the merchant servers 106, the payment gateway 108, the acquirer server 110, the payment network server 112, and the issuer server 114. Examples of the communication network 116 include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the communication environment 100 may connect to the communication network 116 in accordance with various wired and wireless communication protocols, such as Transmission Control Protocol and Internet Protocol (TCP/IP), User Datagram Protocol (UDP), $2^{nd}$ Generation (2G), $3^{rd}$ Generation (3G), $4^{th}$ Generation (4G), $5^{th}$ Generation (5G) communication protocols, Long Term Evolution (LTE) communication protocols, or any combination thereof.

Figure 2A:
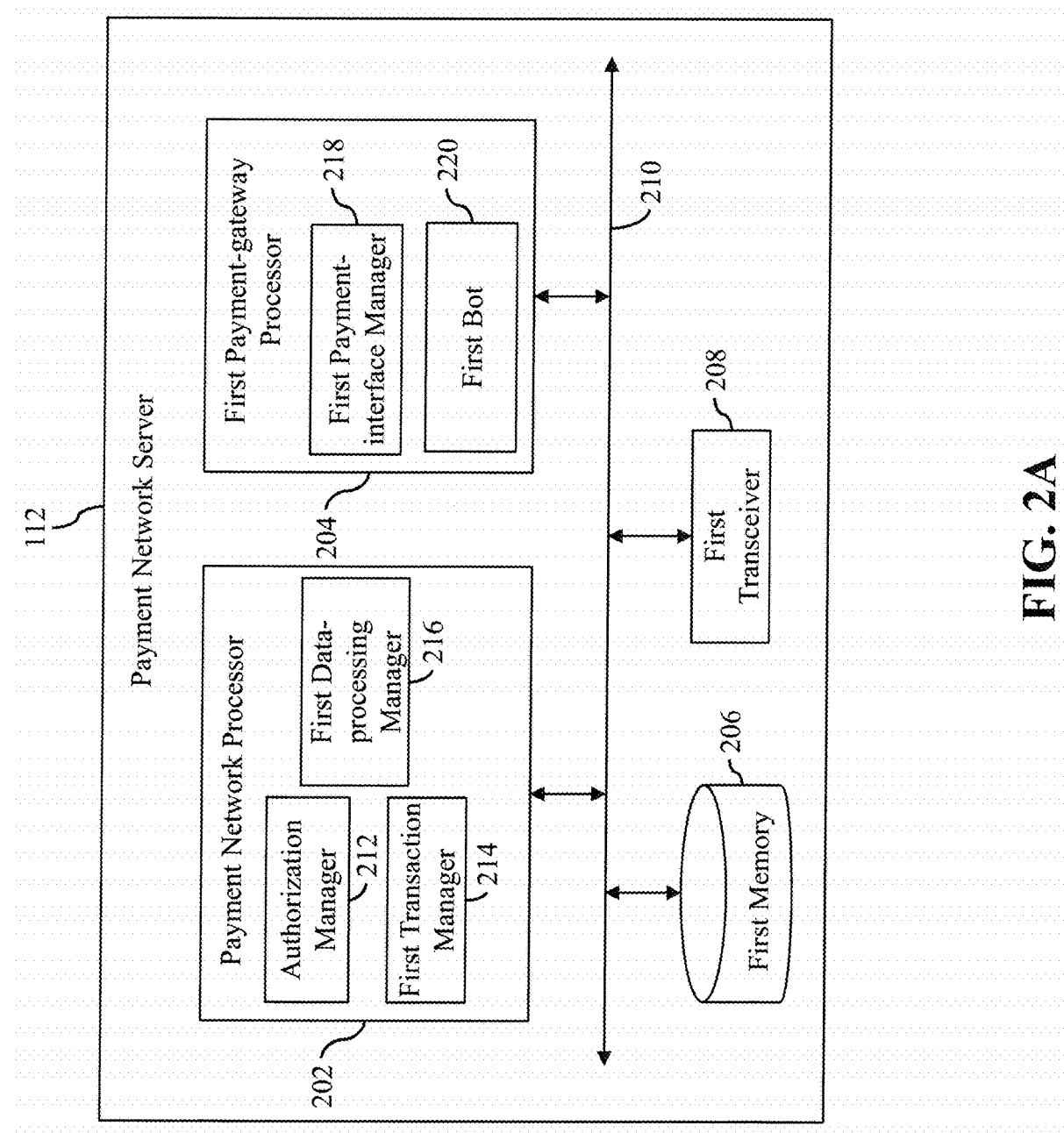
FIG. 2A is a block diagram that illustrates a payment network server of the communication environment of FIG. 1, in accordance with an embodiment of the present invention.

Various components of the payment network server 112 and the issuer server 114 along with their functionality are explained in detail in conjunction with FIG. 2A and FIG. 3, respectively.

FIG. 2A is a block diagram that illustrates the payment network server 112 of the communication environment 100, in accordance with an embodiment of the present invention. The payment network server 112 includes a payment network processor 202, a first payment-gateway processor 204, a first memory 206, and a first transceiver 208 that communicate with each other by way of a first bus 210. The payment network processor 202 includes an authorization manager 212, a first transaction manager 214, and a first data-processing manager 216. The first payment-gateway processor 204 includes a first payment-interface manager 218 and a first bot 220. It will be apparent to a person skilled in the art that the merchant servers 106, the acquirer server 110, or any third-party payment gateway server may also be implemented by using the block diagram of FIG. 2A, without deviating from the scope of the invention.

The payment network processor 202 includes suitable logic, circuitry, and/or interfaces to execute operations for facilitating transactions (such as e-commerce transactions) performed by various users. The payment network processor 202 executes authorization of transaction cards used by the users (such as the user 102) for performing e-commerce transactions. The payment network processor 202 further executes various data management operations for providing the payment processing services to the merchant servers 106. Examples of the payment network processor 202 include, but are not limited to, an application-specific integrated circuit (ASIC) processor, a reduced instruction set computing (RISC) processor, a complex instruction set computing (CISC) processor, a field-programmable gate array (FPGA), and the like. The payment network processor 202 facilitates the transactions (such as the e-commerce transactions) by way of the authorization manager 212 and the first transaction manager 214. The payment network processor 202 executes the data management operations by way of the first data-processing manager 216.

The first payment-gateway processor 204 includes suitable logic, circuitry, and/or interfaces to execute operations for providing various payment processing services to the merchant servers 106. In one embodiment, the first payment-gateway processor 204 hosts the payment gateway 108 for providing the payment processing services. Examples of the first payment-gateway processor 204 include, but are not limited to, an ASIC processor, a RISC processor, a CISC processor, an FPGA, and the like. The first payment-gateway processor 204 provides the payment processing services by way of the first payment-interface manager 218 and the first bot 220.

The first memory 206 includes suitable logic, circuitry, and/or interfaces to store the account profiles for the accounts that are maintained at partner issuer and acquirer banks. The account profiles are updated based on the transactions performed by the users from their corresponding accounts. For example, the account profile of the user 102 is updated, when the user 102 performs any transaction from her account. The first memory 206 further stores details of the e-wallets of multiple users. Examples of the first memory 206 include a random-access memory (RAM), a read-only memory (ROM), a removable storage drive, a hard disk drive (HDD), a flash memory, a solid-state memory, and the like. It will be apparent to a person skilled in the art that the scope of the invention is not limited to realizing the first memory 206 in the payment network server 112, as described herein. In another embodiment, the first memory 206 may be realized in form of a database server or a cloud storage working in conjunction with the payment network server 112, without departing from the scope of the invention.

The first transceiver 208 transmits and receives data over the communication network 116 using one or more communication protocols. The first transceiver 208 transmits/receives various requests and messages to/from at least one of the user device 104, the merchant servers 106, the acquirer server 110, and the issuer server 114. Examples of the first transceiver 208 include, but are not limited to, an antenna, a radio frequency transceiver, a wireless transceiver, a Bluetooth transceiver, an ethernet port, a universal serial bus (USB) port, or any other device configured to transmit and receive data.

The authorization manager 212 includes suitable logic, circuitry, and/or interfaces for authorizing transaction cards used by the user 102 for performing the e-commerce transactions. The authorization manager 212 authorizes a transaction card corresponding to an e-commerce transaction, when verification of the transaction card is successful. The authorization manager 212 may not authorize the transaction card, when the verification of the transaction card is unsuccessful. For verification, the authorization manager 212 matches the credentials of the transaction card used for performing the e-commerce transaction with credentials of various transaction cards stored in the first memory 206. When a match is found, the authorization manager 212 determines the verification is successful.

The first transaction manager 214 includes suitable logic, circuitry, and/or interfaces for generating credit or debit requests (i.e., the transaction requests) for various e-commerce transactions. The first transaction manager 214 communicates the credit or debit requests to the issuer and acquirer servers 114 and 110 by way of the first transceiver 208.

The first data-processing manager 216 includes suitable logic, circuitry, and/or interfaces for retrieving data associated with various users. For example, the first data-processing manager 216 retrieves information pertaining to e-wallets owned by various users based on the registered contact numbers of the users. The first data-processing manager 216 retrieves the registered contact numbers of the users from the corresponding account profiles. The first data-processing manager 216 then queries various e-wallet service providers for retrieving the information pertaining to the e-wallets that are linked to the registered contact numbers. The first data-processing manager 216 updates the account profiles of the users to include the information pertaining to the e-wallets owned by the users. For example, the first data-processing manager 216 determines that three e-wallets are linked to the registered contact number of the user 102. Thus, the first data-processing manager 216 updates the account profile of the user 102 to include the details of the three e-wallets that are linked to the contact number of the user 102.

The first payment-interface manager 218 includes suitable logic, circuitry, and/or interfaces for rendering payment interfaces on the user device 104, when the user 102 proceeds to perform an e-commerce transaction for the purchase of a product and/or a service. The first payment-interface manager 218 renders the default payment interface during a first time-interval. The first payment-interface manager 218 renders a customized payment interface after the first time-interval.

The first bot 220 includes suitable logic, circuitry, and/or interfaces for customizing the default payment interface for each user. The first payment-gateway processor 204 implements the first bot 220 by way of an artificial intelligent algorithm, such as Python, Java, artificial neural networks, or the like. The first bot 220 monitors a purchase pattern of a user (such as the user 102) for the first time-interval and stores the purchase pattern in the first memory 206. The purchase pattern of the user 102 includes frequency-of-use information of various payment options used by the user 102 to perform e-commerce transactions on various e-commerce interfaces for various purchases. The purchase pattern of the user 102 further includes contact information of the user 102, device information of various devices used by the user 102 to make the purchases, real-time location information of the user 102 associated with the purchases, information of the payment options, and spend-range information associated with the purchases. The information included by the purchase pattern is in an encrypted format for ensuring data security. Based on the purchase pattern and the user-profile of the user 102, the first bot 220 learns to identify the first set of payment categories from the various payment categories used by the user 102 to perform the e-commerce transactions during the first time-interval. The first bot 220 further learns to identify the first set of payment options from various payment options used by the user 102 during the first time-interval. The first set of payment categories and options are of high-relevance to the user 102. In other words, the first bot 220 learns to exclude those payment categories and options that are of low-relevance to the user 102 based on the purchase pattern and the user-profile of the user 102. When the user 102 makes a purchase from the first or second merchants after the first time-interval, the first bot 220 customizes the default payment interface and displays only the first set of payment categories and options. In various embodiments, learning of the first bot 220 may be facilitated using one or more machine learning algorithms known in the art.

In operation, when the user 102 performs any e-commerce transaction to purchase a product and/or avail a service from the e-commerce website or the mobile application of any merchant (such as the first and second merchants) within the first time-interval, the first bot 220 notifies the user 102 that the purchase pattern of the user 102 is being monitored. In one embodiment, prior to monitoring the purchase pattern, the first bot 220 requests the user 102 to provide a consent for allowing the first bot 220 to monitor the purchase pattern. In such a scenario, if the user 102 provides the consent, the first bot 220 begins the monitoring of the purchase pattern, else the first bot 220 does not monitor the purchase pattern. The first bot 220 may notify and request the user 102 by way of a short message service (SMS) or an interactive voice response (IVR) call on the registered contact number of the user 102, an e-mail on the registered e-mail ID of the user 102, a push notification on the e-commerce website or the e-commerce mobile application used by the user 102, or the like. In one embodiment, the first bot 220 determines the first time-interval based on a shopping frequency of the user 102. For example, if the user 102 shops more frequently from the e-commerce interfaces in comparison to another user (not shown), the first time-interval is shorter for the user 102 than the other user. Examples of the first time-interval includes two days, one week, one month, one year, or the like. It will be apparent to a person skilled in the art that the first time-interval may vary based on the shopping frequency of the user 102 and is not limited to the examples mentioned above.

For the sake of simplicity, the monitoring of the purchase pattern by the first bot 220 is explained in conjunction with a first e-commerce transaction that the user 102 performs within the first time-interval for purchasing a first product. The user 102 accesses the e-commerce mobile application of the first merchant installed on the user device 104 and selects the first product from a product catalog to purchase. When the user 102 proceeds to make a payment for the first product, the e-commerce mobile application re-directs the control to the payment gateway 108, which is hosted by the payment network server 112 by way of the first payment-gateway processor 204. When the control is re-directed to the payment gateway 108, the first bot 220 receives the user-profile of the user 102 and a real-time location of the user device 104 from the first merchant server 106A associated with the e-commerce mobile application. In one embodiment, the real-time location of the user device 104, which is also the real-time location of the user 102, is tracked based on a navigation device (such as global positioning system) included in the user device 104. The user-profile of the user 102 includes the user details and the purchase history of the user 102 with respect to the e-commerce mobile application of the first merchant.

The first payment-interface manager 218 renders the default payment interface on a display (not shown) of the user device 104 for enabling the user 102 to perform the first e-commerce transaction. The default payment interface presents the available set of payment categories to the user 102. The user 102 selects a payment category from the available set of payment categories. Based on the selection of the payment category, the first payment-interface manager 218 presents the available set of payment options, which falls under the selected payment category, on the default payment interface. The user 102 then selects at least one payment option from the available set of payment options to perform the first e-commerce transaction. The first e-commerce transaction is then processed based on the payment option selected by the user 102. It will be apparent to a person skilled in the art that the payment network server 112, the issuer server 114, and the acquirer server 110 process the e-commerce transaction via the traditional four-party system or the traditional three-party system. An example of the default payment interface is illustrated in conjunction with FIGS. 4 and 5.

The first bot 220 monitors the purchase pattern of the user 102 based on the first e-commerce transaction performed by the user 102. For monitoring the purchase pattern, the first bot 220 retrieves the name, the e-mail ID, and the contact number of the user 102 from the user-profile of the user 102. The first bot 220 then maps the name, the e-mail ID, and the contact number of the user 102 to the account profile of the user 102 that is stored in the first memory 206. In a scenario, when the first memory 206 does not have the account profile of the user 102 stored therein, the first bot 220 creates a new account profile of the user 102. The first bot 220 identifies information pertaining to the payment option selected by the user 102 for performing the first e-commerce transaction. Before identifying the information pertaining to the payment option, the first bot 220 may require a consent from the user 102. In one example, the user 102 may have selected a first transaction card to perform the first e-commerce transaction. In such a scenario, the information associated with the payment option includes the credentials of the first transaction card, which are encrypted. In another example, the user 102 may have selected first account to perform the first e-commerce transaction. In such a case, the information associated with the payment option includes the account identification information of the first account, which is encrypted. Similarly, if the user 102 had used a first e-wallet to perform the first e-commerce transaction, the information associated with the payment option includes encrypted details of the first e-wallet. The first bot 220 further receives device information of the user device 104 used by the user 102 to perform the first e-commerce transaction. The device information may include the unique device ID and the unique network address of the user device 104. Based on a purchase amount associated with the first e-commerce transaction, the first bot 220 determines the spend-range information of the user 102 with respect to the e-commerce mobile application of the first merchant and the payment option used. For example, if the purchase amount of the first e-commerce transaction is "$0-$250", the spend-range information with respect to the e-commerce mobile application of the first merchant and the first transaction card corresponds to "$0-$250". The first bot 220 further determines the frequency-of-use information for the payment option used by the user 102 to perform the first e-commerce transaction. The frequency-of-use information of a payment option refers to a count of times a payment option is used by the user 102 to perform e-commerce transactions with respect to an e-commerce interface. For example, the user 102 may use the first transaction card to perform three e-commerce transactions on the e-commerce mobile application of the first merchant and a first account to perform five e-commerce transactions on the e-commerce website of the first merchant during the first time-interval. In such a scenario, the frequency-of-use information corresponds to "three" for the first transaction card with respect to the e-commerce mobile application of the first merchant. Similarly, the frequency-of-use information corresponds to "five" for the first account with respect to the e-commerce website of the first merchant. The first bot 220 further retrieves the information of the e-wallets that are linked to the contact number and the e-mail ID of the user 102 from the first memory 206 based on the user-profile of the user 102.

The information associated with the payment option and the e-wallets of the user 102, the device information, the spend-range information, the real-time location of the user device 104, and the frequency-of-use information together correspond to the purchase pattern of the user 102. The first bot 220 assigns a purchase pattern ID to the purchase pattern of the user 102 and stores the purchase pattern in the first memory 206. In one embodiment, the purchase pattern is stored as tabular data in an encrypted format in the first memory 206. The encryption of the information included in the purchase pattern ensures data security. The purchase pattern ID is a unique combination of user parameters, such as the name, the contact number, the e-mail ID, the user-ID, or the like, of the user 102. The purchase pattern ID is different for different users.

The first payment-interface manager 218 further presents the default payment interface to the user 102 for performing subsequent e-commerce transactions within the first time-interval. The first bot 220 monitors the information associated with the payment option, the device information, the spend-range information, the real-time location of the user device 104, and the frequency-of-use information for the other e-commerce transactions that the user 102 performs within the first time-interval. The first bot 220 retrieves the purchase pattern of the user 102 that is stored in the first memory 206 based on the user-profile of the user 102 and updates it based on the monitoring. For example, the first bot 220 receives the user-profile of the user 102 when the user 102 performs a second e-commerce transaction. The first bot 220 matches the name, the contact number, the e-mail ID, and/or the user-ID included in the user-profile with a list of purchase pattern IDs. The first bot 220 then retrieves the purchase pattern ID that corresponds to the name, the contact number, the e-mail ID, and/or the user-ID of the user 102. Based on the purchase pattern ID, the first bot 220 retrieves the purchase pattern of the user 102 from the first memory 206 and updates it based on the monitored information associated with the second e-commerce transaction.

In one exemplary scenario, after the first e-commerce transaction, the user 102 may use the first transaction card to perform three e-commerce transactions from the e-commerce mobile application of the first merchant. Thus, the first bot 220 updates the frequency-of-use information of the first transaction card from "one" to "four" with respect to the e-commerce mobile application of the first merchant. Further, the user 102 may have spent "$300", "$100", and "$500" as purchase amounts for the three e-commerce transactions. Thus, the first bot 220 updates the spend-range information of the user 102 from "$250" to "$100-$500" with respect to the e-commerce mobile application of the first merchant and the first transaction card. From the three e-commerce transactions, the user 102 may have performed the two e-commerce transactions by using the user device 104 and the remaining one e-commerce transaction by using another device. Thus, the first bot 220 updates the purchase pattern to include the device information of the other device.

In another exemplary scenario, after the first e-commerce transaction, the user 102 performs five e-commerce transactions through the e-commerce mobile application of the first merchant. The user 102 uses the first transaction card to perform two out of five e-commerce transactions and a first account to perform the remaining three e-commerce transactions. Thus, the first bot 220 updates the frequency-of-use information of the first transaction card from "one" to "three" and the frequency-of-use information of the first account from "zero" to "three" with respect to the e-commerce mobile application of the first merchant. Further, the user 102 may have spent "$300" and "$100" by using the first transaction card and "$1,500", "$600", and "$800" by using the first account. Thus, the first bot 220 updates the spend-range information of the user 102 from "$250" to "$100-$300" with respect to the e-commerce mobile application of the first merchant and the first transaction card. The first bot 220 further updates the spend-range information of the user 102 from "$0" to "$600-$1,500" with respect to the e-commerce mobile application of the first merchant and the first account. The user 102 may have used the user device 104 for performing two e-commerce transactions and another device for performing the remaining three transactions. Thus, the first bot 220 updates the purchase pattern to include the device information of the other device.

In yet another scenario, after the first e-commerce transaction, the user 102 may use a second transaction card to perform two e-commerce transactions from the e-commerce mobile application of the second merchant. In such a scenario, the first bot 220 updates the frequency-of-use information of the second transaction card from "zero" to "two" with respect to the e-commerce mobile application of the second merchant. The frequency-of-use information of the first transaction card remains "one" with respect to the e-commerce mobile application of the first merchant. Further, the user 102 may have spent "$200" and "$150" for the two e-commerce transactions. Thus, the first bot 220 updates the spend-range information of the user 102 from "zero" to "$100-$150" with respect to the e-commerce mobile application of the second merchant and the second transaction card. Since the user 102 did not perform any e-commerce transaction from the e-commerce mobile application of the first merchant, the spend-range information of the user 102 remains "$250" with respect to the e-commerce mobile application of the first merchant and the first transaction card.

A person having ordinary skill in the art will appreciate that above-mentioned scenarios are for exemplary purpose and do not limit the scope of the invention. The first bot 220 may suitably update the purchase pattern of the user 102 in any manner based on the e-commerce transactions performed by the user 102 within the first time-interval. An exemplary purchase pattern is illustrated later in conjunction with FIGS. 2B-2G.

When the user 102 wishes to perform an e-commerce transaction after the first time-interval, the first bot 220 customizes the default payment interface and the first payment-interface manager 218 displays the customized payment interface to the user 102 for performing the e-commerce transaction. For customizing the default payment interface, the first bot 220 learns to identify the first set of payment categories and the first set of payment options for the user 102 based on the purchase pattern of the user 102, the user-profile, and a minimum frequency-of-use rule. In an exemplary scenario, the user 102 may wish to perform an e-commerce transaction to purchase a second product having a purchase amount of "$350" through the e-commerce mobile application of the first merchant. The first bot 220 receives the user-profile of the user 102 from the first merchant server 106A. Based on the user-profile, the first bot 220 retrieves the purchase pattern of the user 102. Payment categories and options of the purchase pattern for which a frequency-of-use value (as indicated by the frequency-of-use information) exceeds a minimum frequency-of-use value (as set by the payment network), are included into the first set of payment categories and options, respectively, by the first bot 220. For example, the user 102 may have used the transaction card category for performing 50 e-commerce transactions, the net-banking category for performing 45 e-commerce transactions, the e-wallet category for performing 25 e-commerce transactions, and the reward points category for performing two e-commerce transactions within the first time-interval as indicated by the purchase pattern of the user 102. When the minimum frequency-of-use value is "five", the first bot 220 includes the transaction card, the net-banking, and the e-wallet categories into the first set of payment categories and does not include the reward points category into the first set of payment categories. In other words, the first bot 220 excludes a second set of payment categories (such as the reward points category) of the purchase pattern to be included in the first set of payment categories. Under the transaction card category, the user 102 may have used first through third transaction cards for performing 25, 23, and two e-commerce transactions, respectively, within the first time-interval. Under the net-banking category, the user 102 may have used first through third accounts for performing 25, 18, and two e-commerce transactions, respectively, within the first time-interval. Similarly, under the e-wallet category, the user 102 may have used first and second e-wallets for performing 20 and five e-commerce transactions, respectively, within the first time-interval as indicated by the purchase pattern of the user 102. When the minimum frequency-of-use value is "ten", the first bot 220 includes the first and second transaction cards into the first set of payment options under the transaction card category and does not include the third transaction card. The first bot 220 further includes the first and second accounts into the first set of payment options under the net-banking category and does not include the third account. Similarly, the first bot 220 also includes the first e-wallet into the first set of payment options under the e-wallet category and does not include the second e-wallet. In other words, the first bot 220 excludes a second set of payment options (such as the third transaction card, the third account, or the second e-wallet) from the first set of payment options.

The first bot 220 further determines a preference order for the first set of payment options based on at least one of the purchase pattern, one or more offers associated with the first set of payment options, and the one or more user preferences. In one example, the transaction card category may include first through third transaction cards (i.e., the first set of payment options). Based on the purchase pattern, the first bot 220 may determine that the first transaction card has the maximum frequency-of-use with respect to the e-commerce mobile application of the first merchant. The first bot 220 may further determine that the third transaction card offers a discount of 20% for the current e-commerce transaction. In such a scenario, the first bot 220 determines that the first transaction card has the highest preference because it has the maximum frequency-of-use with respect to the e-commerce mobile application of the first merchant and the second transaction card has the lowest preference as it has no offers associated with it and has lower frequency-of-use. In another example, the transaction card category may include first through fourth transaction cards as the first set of payment options. Based on the purchase pattern, the second bot 320 may determine that the second transaction card has the maximum frequency-of-use with respect to the mobile application of the first merchant. The first bot 220 may further determine that the first transaction card offers a discount of 10% and the fourth transaction card offers a discount of 20% for the current e-commerce transaction. The first bot 220 may further determine that the user 102 has specified to display the third transaction card as a first payment option when the transaction card category is selected irrespective of any e-commerce interface. In such a scenario, the first bot 220 determines that the third transaction card has the highest preference because of the user preference (overriding its frequency-of-use) and the second transaction card has the second highest preference as it has the maximum frequency-of-use with respect to the e-commerce mobile application of the first merchant. Since the first transaction card offers a lower discount as compared to the fourth transaction card, the first bot 220 determines that the fourth transaction card has higher preference than the first transaction card. Hence, the preference order (i.e., in a descending preference manner) as determined by the first bot 220 is "the third transaction card, the second transaction card, the fourth transaction card, and the first transaction card". Similarly, the first bot 220 determines the preference order for the first set of payment options that falls under other payment categories of the first set of payment categories. Based on this learning, the first bot 220 retrieves information pertaining to the first set of payment categories and options from the purchase pattern and customizes the default payment interface.

The first payment-interface manager 218 then renders the customized payment interface on the display of the user device 104 for enabling the user 102 to perform the e-commerce transaction. The customized payment interface presents the first set of payment categories to the user 102. The user 102 may select a payment category from the first set of payment categories. Based on the selection of the payment category, the first payment-interface manager 218 presents the first set of payment options that falls under the selected payment category in the determined preference order. Based on the selection of the payment option by the user 102, the e-commerce transaction is processed. For example, the user 102 may select the first transaction card as the payment option. In a scenario, the first transaction card may be issued by the issuer bank of the issuer server 114 and associated with the payment network server 112. In such a scenario, the authorization manager 212 authorizes the first transaction card. Based on the authorization, the first transaction manager 214 communicates a debit request to the issuer server 114. Based on the debit request, the second transaction manager 314 determines whether the available credit line or the account balance of the account linked to the first transaction card covers the purchase amount of the e-commerce transaction. When the available credit line or the account balance of the account linked to the first transaction card covers the purchase amount, the authentication manager 312 authenticates the user 102 by various authentication techniques known in the art. The purchase amount is deducted from the account linked to the first transaction card by the issuer server 114 when the authentication of the user 102 is successful and credited to the merchant account of the first merchant by the acquirer server 110.

It will be apparent to a person having ordinary skill in the art that the identification of the first set of payment categories and the first set of payment options for the user 102 may be based on one or more other rules. The one or more other rules may include a spend-range rule, a device information rule, real-time location rule, or the like. Based on the spend-range rule and the purchase pattern, the first bot 220 may not include the payment categories and options into the first set of payment categories and options, respectively, for which the spend-range information does not satisfy the purchase amount of a current e-commerce transaction. For example, based on the purchase pattern, the first bot 220 determines that the spend-range information for the transaction card, the net-banking, and the e-wallet categories is "$100-$500", "$400-$800", and "$200-$1,000", respectively. When the purchase amount of the current e-commerce transaction is "$700", the first bot 220 includes the net-banking and e-wallet categories in the first set of payment categories but does not include the transaction card category. In addition, the first bot 220 does not include the payment options for which the spend-range information does not satisfy the purchase amount of "$700" into the first set of payment options that falls under the first set of payment categories. In a similar manner, the first bot 220 may exclude the payment categories and options from the first set of payment categories and options, respectively, for which the device information does not match the device information of the current e-commerce transaction. In one embodiment, the first bot 220 may exclude the payment categories and options from the first set of payment categories and options, respectively, for which the real-time location of the user 102 does not match the real-time location of the user 102 for the current e-commerce transaction. Thus, the first set of payment categories and options identified by the first bot 220 may be different for different purchases having different purchase amounts based on the spend-range rule. Similarly, the first set of payment categories and options identified by the first bot 220 may be different for purchases made by using different devices based on the device information rule. In addition, the first set of payment options identified by the first bot 220 may be different for purchases made through different e-commerce interfaces and from different locations, based on the frequency-of-use rule and the real-time location rule, respectively.

In one scenario, when the user 102 is not satisfied with the first set of payment categories and options, the user 102 may provide her feedback on the customized payment interface for viewing the available set of payment categories and options. The first payment-interface manager 218 receives the feedback provided by the user 102 and thus presents the default payment interface including the available set of payment categories and options to the user 102. Based on the feedback, the first bot 220 re-monitors the purchase pattern of the user 102 for a second time-interval in a similar manner as monitored for the first time-interval. The second time-interval may or may not be same as the first time-interval. The first bot 220 then re-learns to identify a third set of payment categories and options for customizing the default payment interface after the second time-interval, based on the re-monitored purchase pattern.

Thus, the payment network server 112 provides a payment gateway service to merchants (such as the first and second merchants) for improving the shopping experience of the user 102 by implementing the first payment-gateway processor 204. The first bot 220 customizes the default payment interface for the user 102 based on the purchase pattern and the user-profile of the user 102. Hence, the customized payment interface as rendered by the first payment-interface manager 218 presents payment categories and options (such as the first set of payment categories and options) that are relevant to the user 102. In other words, the user 102 is saved from the hassle of scanning all the payment categories and options on the default payment interface to find one relevant payment category and option. This is because the customized payment interface is de-cluttered and includes only those payment categories and options that are frequently used by the user 102. In addition to improving the shopping experience of the user 102, the payment network server 112 ensures that the purchase pattern of the user 102 is secure by storing the purchase pattern in the first memory 206 in an encrypted format. The first bot 220 identifies and retrieves the first set of payment categories and options from the first memory 206 at the time the user 102 wishes to perform an e-commerce transaction for the purchase. Further, the first bot 220 does not have an access to confidential information associated with the first set of payment options. Further, the user 102 is no longer required to save the confidential information of various payment options at multiple e-commerce interfaces. This is because the first bot 220 customizes the default payment interface by including only relevant payment categories and options for all the e-commerce interfaces.

Figure 2B:
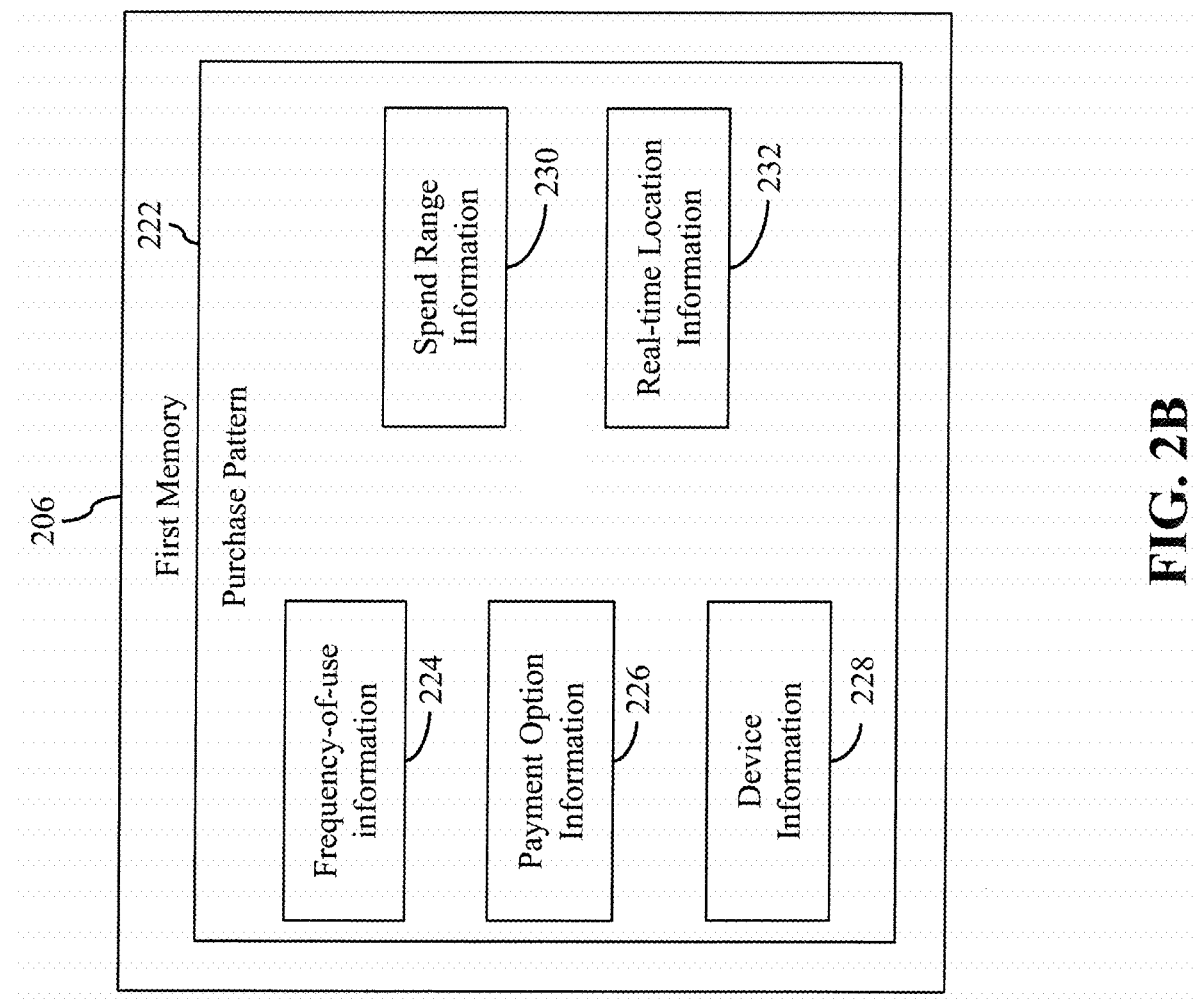
FIG. 2B is a block diagram that illustrates a purchase pattern that is stored by the payment network server of FIG. 2A, in accordance with an embodiment of the present invention.

FIG. 2B is a block diagram that illustrates a purchase pattern 222 of the user 102 that is stored by the payment network server 112 of FIG. 2A, in accordance with an embodiment of the present invention. The purchase pattern 222 is stored in the first memory 206. The purchase pattern 222 includes frequency-of-use information 224, payment option information 226, device information 228, spend-range information 230, and real-time location information 232. The frequency-of-use information 224 of a payment option includes information pertaining to the number of times the user 102 had used the corresponding payment option to make purchases at various payment interfaces. The frequency-of-use information 224 is illustrated later in conjunction with FIG. 2C. The payment option information 226 includes encrypted information pertaining to the payment options (such as transaction cards, accounts, e-wallets, or the like) that are used by the user 102 to make purchases at the payment interfaces. In one embodiment, the payment option information 226 may be obtained after a consent provided by the user 102. The payment option information 226 is illustrated later in conjunction with FIG. 2D. The device information 228 includes information of various devices (such as the user device 104) that are used by the user 102 to access the payment interfaces for making purchases. The device information 228 is illustrated later in conjunction with FIG. 2E. The spend-range information 230 includes information pertaining to the spend-range of the user 102 with respect to the payment options and the payment interfaces. The spend-range information 230 is illustrated later in conjunction with FIG. 2F. The real-time location information 232 includes information pertaining to real-time locations of the user 102, when the user 102 made the purchases. The real-time location information 232 is illustrated later in conjunction with FIG. 2G.

FIGS. 2C-2G are block diagrams that illustrate information included in the purchase pattern 222 of FIG. 2B, in accordance with an embodiment of the present invention. With reference to FIG. 2C, the frequency-of-use information 224 is illustrated by way of a table. Column 224A of the frequency-of-use information 224 depicts various payment categories (such as transaction card, e-wallet, and net-banking categories) used by the user 102 to make the purchases. Column 224B of the frequency-of-use information 224 depicts various payment options (such as first and second transaction cards, first e-wallet, and first account) under the payment categories of the column 224A that are used by the user 102 to make the purchases. Column 224C of the frequency-of-use information 224 depicts various payment interfaces (such as first and second merchant websites, and first and second merchant applications) that are used by the user 102 to make the purchases with respect to each payment option of the column 224B. Column 224D depicts frequency-of-use of each payment option of the column 224B with respect to the corresponding payment interface of the column 224C. For example, the first transaction card has a frequency-of-use "25" with respect to the first merchant website. Similarly, based on the frequency-of-use information 224, the transaction card category has a frequency-of-use "45" with respect to the first merchant website.

Figure 2D:

With reference to FIG. 2D, the payment option information 226 is illustrated by way of a table. Column 226A of the payment option information 226 depicts various payment categories (such as transaction card, e-wallet, and net-banking categories) used by the user 102 to make the purchases. Column 226B of the payment option information 226 depicts various payment options (such as first and second transaction cards, first e-wallet, and first account) under the payment categories of the column 226A that are used by the user 102 to make the purchases. Column 226C of the payment option information 226 depicts encrypted information and details of each payment option of the column 226B. For example, the column 226C depicts credentials (such as encrypted card number, encrypted expiry date, and encrypted account number) of the first transaction card that is used by the user 102 to make the purchases. The first bot 220 obtains the payment option information 226 after the consent of the user 102 for ensuring data privacy.

With reference to FIG. 2E, the device information 228 is illustrated by way of a table. Column 228A of the device information 228 depicts various payment categories (such as transaction card, e-wallet, and net-banking categories) used by the user 102 to make the purchases. Column 228B of the device information 228 depicts various payment options (such as first and second transaction cards, first e-wallet, and first account) under the payment categories of the column 228A that are used by the user 102 to make the purchases. Column 228C of the device information 228 depicts various payment interfaces (such as first and second merchant websites, and first and second merchant applications) that are used by the user 102 to make the purchases with respect to each payment option of the column 228B. Column 228D depicts information and details of various devices (such as the user device 104 and other devices (not shown)) that are used by the user 102 to access the payment interfaces of the column 228C for making purchases. For example, the column 228D includes a name "user device 1" and unique device ID "xxx.xx.xxx.234" of the user device 104 that is used by the user 102 to make purchases at the first merchant website by way of the first transaction card.

With reference to FIG. 2F, the spend-range information 230 is illustrated by way of a table. Column 230A of the spend-range information 230 depicts various payment categories (such as transaction card, e-wallet, and net-banking categories) used by the user 102 to make the purchases. Column 230B of the spend-range information 230 depicts various payment options (such as first and second transaction cards, first e-wallet, and first account) under the payment categories of the column 230A that are used by the user 102 to make the purchases. Column 230C of the spend-range information 230 depicts various payment interfaces (such as first and second merchant websites, and first and second merchant applications) that are used by the user 102 to make the purchases with respect to the payment options of the column 230B. Column 230D depicts spend range of the user 102 with respect to the payment interfaces of the column 230C and the payment options of the column 230B. For example, the user 102 has a spend range of "$200-$1,000" with respect to the first merchant website of the column 230C and the first transaction card of the column 230B.

With reference to FIG. 2G, the real-time location information 232 is illustrated by way of a table. Column 232A of the real-time location information 232 depicts various payment categories (such as transaction card, e-wallet, and net-banking categories) used by the user 102 to make the purchases. Column 232B of the real-time location information 232 depicts various payment options (such as first and second transaction cards, first e-wallet, and first account) under the payment categories of the column 232A that are used by the user 102 to make the purchases. Column 232C of the real-time location information 232 depicts various payment interfaces (such as first and second merchant websites, and first and second merchant applications) that are used by the user 102 to make the purchases with respect to the payment options of the column 232B. Column 232D depicts real-time information of various devices (such as the user device 104 and other devices (not shown)) used by the user 102, when the user 102 had made the purchases. For example, the column 232D includes a name "user device 1" and the real-time locations (such as "location 1", "location 2", and "location 3") of the user device 104 used by the user 102, when she made purchases from the first merchant web site by way of the first transaction card. Similarly, the column 232D further includes a name "user device 2" and the real-time locations (such as "location 1" and "location 3") of another user device (not shown) used by the user 102, when she made purchases from the second merchant web site by way of the first transaction card.

It will be apparent to a person having ordinary skill in the art that FIGS. 2C-2G are exemplary scenarios and should not be construed to limit the scope of the invention in any way. In another embodiment, the purchase pattern 222 may be stored in the first memory 206 as a single table that may be obtained by merging the tables illustrated in FIGS. 2C-2G without deviating from the scope of the disclosure. Further, the first bot 220 may update the purchase pattern 222 and the corresponding information (as illustrated in FIGS. 2C-2G) based on the purchases made by the user 102. Further, as illustrated in FIGS. 2C-2G, the information corresponding to the purchase pattern 222 is stored in the encrypted format.

FIG. 3 is a block diagram that illustrates the issuer server 114 of the communication environment 100, in accordance with an embodiment of the present invention. The issuer server 114 includes an issuer processor 302, a second payment-gateway processor 304, a second memory 306, and a second transceiver 308 that communicate with each other by way of a second bus 310. The issuer processor 302 includes an authentication manager 312, a second transaction manager 314, and a second data-processing manager 316. The second payment-gateway processor 304 includes a second payment-interface manager 318 and a second bot 320. It will be apparent to a person skilled in the art that the merchant servers 106, the acquirer server 110, or any third-party payment gateway server may also be implemented by using the block diagram of FIG. 3, without deviating from the scope of the invention.

The issuer processor 302 includes suitable logic, circuitry, and/or interfaces to execute operations for facilitating transactions (such as e-commerce transactions) performed by various users. The issuer processor 302 authenticates the users (such as the user 102), who perform the transactions. Further, the issuer processor 302 further processes the transactions for accepting or declining. In one embodiment, the issuer processor 302 may execute various data management operations for providing the payment processing services to the merchant servers 106. Examples of the issuer processor 302 include, but are not limited to, an ASIC processor, a RISC processor, a CISC processor, an FPGA, and the like. The issuer processor 302 facilitates the transactions by way of the authentication manager 312 and the second transaction manager 314. The issuer processor 302 executes the data management operations by way of the second data-processing manager 316.

The second payment-gateway processor 304 includes suitable logic, circuitry, and/or interfaces to execute operations for providing various payment processing services to the merchant servers 106. In one embodiment, the second payment-gateway processor 304 may host the payment gateway 108 for providing the payment processing services. Examples of the second payment-gateway processor 304 include, but are not limited to, an ASIC processor, a RISC processor, a CISC processor, an FPGA, and the like. The second payment-gateway processor 304 provides the payment processing services by way of the second payment-interface manager 318 and the second bot 320.

The second memory 306 includes suitable logic, circuitry, and/or interfaces to store account profiles for the accounts that are maintained at the issuer bank. The account profiles are updated based on the transactions performed by the users from their corresponding accounts. The second memory 306 may store details pertaining to the e-wallets of multiple users. Examples of the second memory 306 include a RAM, a ROM, a removable storage drive, a HDD, a flash memory, a solid-state memory, and the like. It will be apparent to a person skilled in the art that the scope of the invention is not limited to realizing the second memory 306 in the issuer server 114, as described herein. In other embodiments, the second memory 306 may be realized in form of a database server or a cloud storage working in conjunction with the issuer server 114, without departing from the scope of the invention.

The second transceiver 308 transmits and receives data over the communication network 116 using one or more communication protocols. The second transceiver 308 transmits/receives various requests and messages to/from at least one of the user device 104, the merchant servers 106, the acquirer server 110, and the payment network server 112. Examples of the second transceiver 308 include, but are not limited to, an antenna, a radio frequency transceiver, a wireless transceiver, a Bluetooth transceiver, an ethernet port, a USB port, or any other device configured to transmit and receive data.

The authentication manager 312 includes suitable logic, circuitry, and/or interfaces for authenticating the users, who perform the transactions. The authentication manager 312 may use one or more authentication techniques known in the art for performing the authentication. The authentication manager 312 approves a transaction when the authentication of the corresponding user performing the transaction, is successful. The authentication manager 312 declines a transaction when the authentication of the corresponding user, is unsuccessful.

The second transaction manager 314 includes suitable logic, circuitry, and/or interfaces for crediting or debiting the accounts of various users based on the corresponding credit or debit requests. In one scenario, the second transaction manager 314 may decline a transaction when the account holder's available credit line or the account balance fails to cover a transaction amount (such as the purchase amount) associated with the transaction. In an alternate scenario, the second transaction manager 314 may approve the transaction when the account holder's available credit line or the account balance covers the transaction amount. The second transaction manager 314 further credits or debits the transaction amount from an account that corresponds to the transaction, when the transaction is approved and the authentication of the user (such as the user 102) performing the transaction, is successful.

The second data-processing manager 316 includes suitable logic, circuitry, and/or interfaces for retrieving information associated with various users. For example, the second data-processing manager 316 retrieves information pertaining to the e-wallets owned by the users from various e-wallet service providers based on the registered contact numbers of the users. The second data-processing manager 316 updates the account profiles of the users to include the information pertaining to the e-wallets owned by the users. The second data-processing manager 316 further updates the account profiles based on the transactions that are performed from the corresponding accounts.

The second payment-interface manager 318 includes suitable logic, circuitry, and/or interfaces for rendering the default and customized payment interfaces on the user device 104, when the user 102 proceeds to perform an e-commerce transaction for the purchase of a product and/or a service. The second payment-interface manager 318 presents the default payment interface to the user 102, when the user 102 performs e-commerce transactions within the first time-interval and the customized payment interface after the first time-interval.

The second bot 320 includes suitable logic, circuitry, and/or interfaces for customizing the default payment interface for each user. The second payment-gateway processor 304 implements the second bot 320 by way of an artificial intelligent algorithm, such as Python, Java, artificial neural networks, or the like. The second bot 320 monitors the purchase pattern of a user (such as the user 102) for the first time-interval and stores the purchase pattern in the second memory 306. Based on the purchase pattern and the user-profile of the user 102, the second bot 320 learns to identify the first set of payment categories from the various payment categories used by the user 102 to perform the e-commerce transactions during the first time-interval. The second bot 320 further learns to identify the first set of payment options from various payment options used by the user 102 during the first time-interval. In other words, the second bot 320 learns to exclude those payment categories and options that are of low-relevance to the user 102 based on the purchase pattern and the user-profile of the user 102. When the user 102 makes a purchase from the first or second merchants after the first time-interval, the second bot 320 customizes the default payment interface and displays only the first set of payment categories and options. In various embodiments, learning of the second bot 320 may be facilitated using one or more machine learning algorithms known in the art. It will be apparent to a person having ordinary skill in the art that the second payment-interface manager 318 and the second bot 320 are functionally similar to the first payment-interface manager 218 and the first bot 220, respectively.

In operation, when the user 102 performs any e-commerce transaction through the e-commerce website or the e-commerce mobile application of any merchant (such as the first and second merchants) within the first time-interval, the second bot 320 notifies the user 102 that the purchase pattern of the user 102 is being monitored. In one embodiment, prior to monitoring the purchase pattern, the second bot 320 requests the user 102 to provide a consent for allowing the second bot 320 to monitor the purchase pattern. In such a scenario, if the user 102 provides the consent, the second bot 320 begins to monitor the purchase pattern, else the second bot 320 does not monitor the purchase pattern. In one embodiment, the second bot 320 determines the first time-interval as described in FIG. 2A.

For the sake of simplicity, the monitoring of the purchase pattern by the second bot 320 is explained in conjunction with the first e-commerce transaction that the user 102 performs within the first time-interval for purchasing the first product. The user 102 accesses the mobile application of the first merchant for purchasing the first product. When the user 102 proceeds to perform the first e-commerce transaction, the mobile application re-directs the control to the payment gateway 108, which is hosted by the issuer server 114, by way of the second payment-gateway processor 304. The second bot 320 then receives the user-profile of the user 102 and a real-time location of the user device 104 from the first merchant server 106A.

The second payment-interface manager 318 presents the default payment interface to the user 102 for performing the first e-commerce transaction. The default payment interface includes the available set of payment categories. The user 102 selects a payment category from the available set of payment categories. Based on the selection of the payment category, the available set of payment options which falls under the selected payment category is presented through the default payment interface to the user 102. The user 102 then selects at least one payment option from the available set of payment options to perform the first e-commerce transaction for purchasing the first product. It will be apparent to a person skilled in the art that the payment network server 112, the issuer server 114, and the acquirer server 110 process the e-commerce transaction via the traditional four-party system or the traditional three-party system.

The second bot 320 monitors the purchase pattern of the user 102 based on the first e-commerce transaction. The second bot 320 maps the name, the e-mail ID, and the contact number included in the user-profile of the user 102 to the account profile of the user 102 that is stored in the second memory 306. The second bot 320 creates a new account profile of the user 102, if the second memory 306 does not include the account profile of the user 102. The second bot 320 identifies information pertaining to the payment option used the user 102 for performing the first e-commerce transaction. The second bot 320 identifies the information pertaining to the payment option based on a consent provided by the user 102, and thereby ensures data privacy. The second bot 320 further receives the device information of the user device 104 used by the user 102 to perform the first e-commerce transaction. The second bot 320 further determines the spend-range information of the user 102 with respect to the e-commerce mobile application of the first merchant and the frequency-of-use information for the payment option used by the user 102. The second bot 320 further retrieves the information pertaining to the e-wallets that are linked to the contact number and the e-mail ID of the user 102 from the second memory 306.

The information associated with the payment option and the e-wallets, the device information, the spend-range information, the real-time location of the user 102, and the frequency-of-use information correspond to the purchase pattern of the user 102 as monitored by the second bot 320. The second bot 320 assigns a purchase pattern ID to the purchase pattern of the user 102 and stores the purchase pattern in an encrypted format in the second memory 306 for ensuring data security. It will be apparent to a person having ordinary skill in the art that the purchase pattern stored in the second memory 306 is similar to the purchase pattern 222 stored in the first memory 206.

The second payment-interface manager 318 further presents the default payment interface to the user 102 for performing subsequent e-commerce transactions within the first time-interval. The second bot 320 monitors and updates the purchase pattern stored in the second memory 306, based on the subsequent e-commerce transactions performed by the user 102 within the first time-interval. The second bot 320 updates the purchase pattern in a similar manner as updated by the first bot 220 in FIG. 2A.

When the user 102 wishes to perform an e-commerce transaction through the e-commerce mobile application of the first merchant after the first time-interval, the second bot 320 customizes the default payment interface in a similar manner as explained in conjunction with FIG. 2A. The second payment-interface manager 318 renders the customized payment interface on the user device 104 for enabling the user 102 to perform the e-commerce transaction. The second bot 320 further determines the preference order to display the payment options of the first set of payment options. The second bot 320 determines the preference order based on at least one of the purchase pattern, one or more offers associated with the first set of payment options, and the one or more user preferences as explained in conjunction with FIG. 2A. In one embodiment, the second bot 320 determines one or more delivery addresses for the first product, based on the purchase pattern and the real-time location of the user 102 with respect to the first transaction. For example, the second bot 320 compares the real-time of the user 102 (with respect to the first transaction) with real-time locations included in the purchase pattern. The second bot 320 retrieves the one or more delivery addresses associated with the real-time location that matched the real-time of the user 102 with respect to the first transaction. The customized payment interface presents the first set of payment categories to the user 102. The user 102 may select a payment category from the first set of payment categories. Based on the selection of the payment category, the second payment-interface manager 318 presents the first set of payment options that falls under the selected payment category in the determined preference order.

Based on the selection of the payment option by the user 102, the e-commerce transaction is processed. For example, the user 102 may select the first e-wallet as the payment option. In a scenario when the first e-wallet may be maintained by a third-party e-wallet provider (not shown), the third-party wallet provider determines whether the account balance of the first e-wallet covers the purchase amount of the e-commerce transaction. When the available account balance of the first e-wallet covers the purchase amount, the third-party wallet provider authenticates the user 102. The purchase amount is deducted from the account linked to the first e-wallet when the authentication of the user 102 is successful and credited to the merchant account of the first merchant.

It will be apparent to a person having ordinary skill in the art that the e-commerce transaction may be processed in a different manner as explained above based on a different payment option selected by the user 102. In one embodiment, the customized payment interface may include the one or more deliver addresses determined by the second bot 320. The customized payment interface may further include contact details, such as name, contact number, e-mail ID of the user 102.

Figure 4:
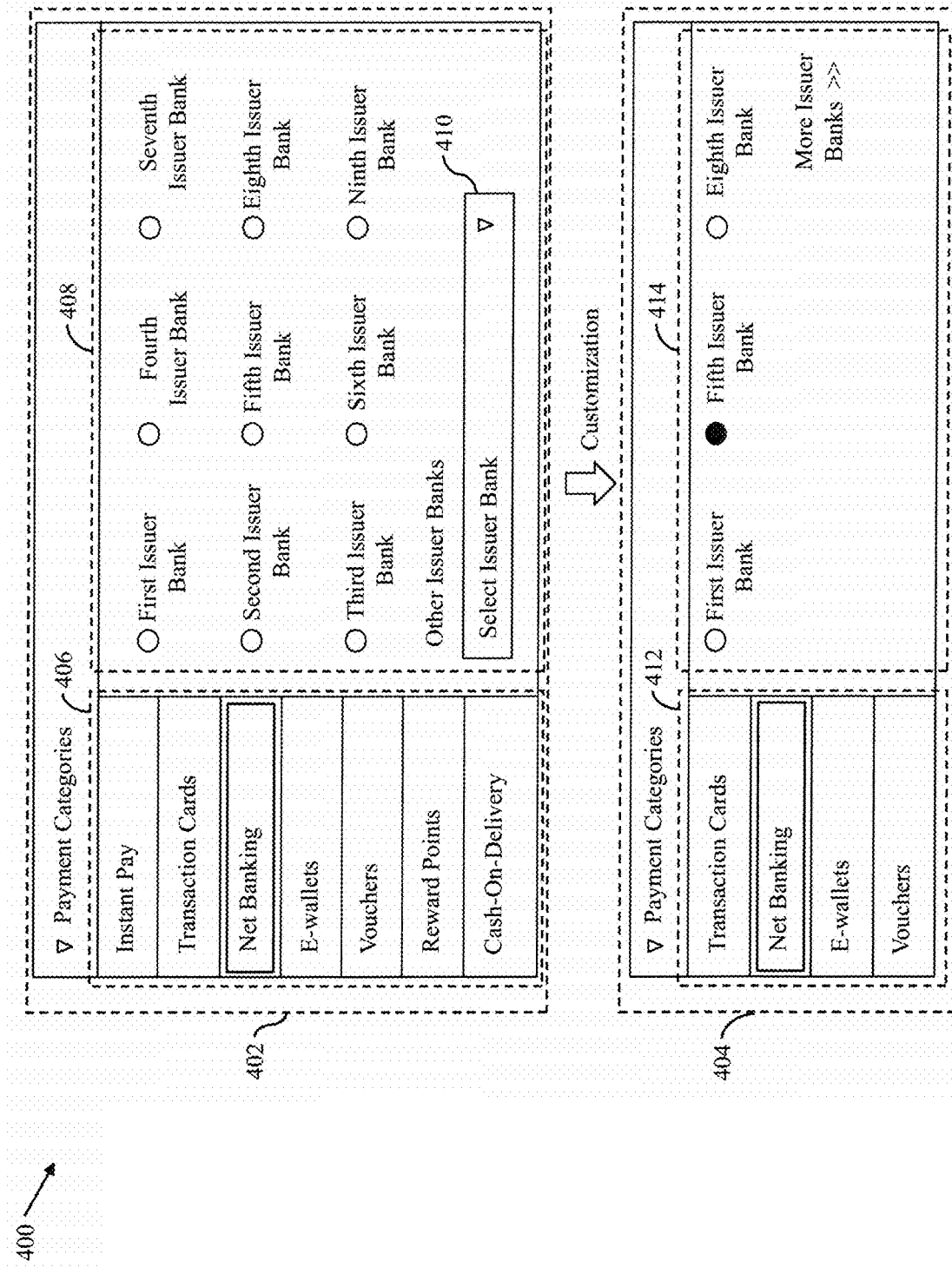
FIG. 4 is an exemplary scenario that illustrates a default payment interface and a customized payment interface, in accordance with an embodiment of the present invention.

FIG. 4 is an exemplary scenario 400 that illustrates a first default payment interface 402 and a first customized payment interface 404, in accordance with an embodiment of the present invention.

The first default payment interface 402 is a GUI that is presented on the of the user device 104, when the user 102 wishes to perform an e-commerce transaction within the first time-interval. The first default payment interface 402 includes a first portion 406 and a second portion 408. The first portion 406 presents the available set of payment categories (such as instant pay, transaction cards, net-banking, e-wallets, vouchers, reward points, cash-on-delivery, and the like) of the first default payment interface 402 to the user 102. The user 102 may select any payment category from the available set of categories. For example, the user 102 has selected the net banking category presented in the first portion 406. When the user 102 selects a payment category from the available set of categories, the corresponding available set of payment options is presented in the second portion 408. For example, the second portion 408 presents first through ninth issuer banks as payment options to the user 102. In one embodiment, the first through ninth issuer banks are presented on the second portion 408 based on popularity among the users. The second portion 408 further includes a drop-down list 410 that presents other available issuer banks to the user 102, when the user 102 selects the drop-down list 410. For example, the issuer bank that the user 102 wishes to use may not be included in the first through ninth issuer banks. Thus, the user 102 selects the drop-down list 410 to view the other available issuer banks. The first through ninth issuer banks displayed on the second portion 408 may or may not be relevant to the user 102. Further, the user 102 may not have account with all the first through ninth banks or the other available issuer banks included in the drop-down list 410. A bot (such as the first or second bot 220 or 320) customizes the first default payment interface 402 based on the purchase pattern (such as the purchase pattern 222) and the user-profile of the user 102 as described in conjunction with FIGS. 2A and 3.

The first customized payment interface 404 is a GUI that is presented on the display of the user device 104, when the user 102 wishes to perform an e-commerce transaction after the first time-interval. The first customized payment interface 404 includes a third portion 412 and a fourth portion 414. The third portion 412 presents the first set of payment categories (such as transaction cards, net-banking, e-wallets, and vouchers) identified by the first or second bot 220 or 320 to the user 102. In one embodiment, the first set of payment categories and options identified by the first or second bot 220 or 320 may be different for different users based on the corresponding purchase patterns (such as the purchase pattern 222). The user 102 may select any payment category from the first set of categories. For example, the user 102 has selected the net-banking category presented in the third portion 412. When the user 102 selects a payment category from the first set of categories, the corresponding first set of payment options is presented in the fourth portion 414. For example, the fourth portion 414 presents the first, fifth and eighth issuer banks as payment options to the user 102. The first, fifth and eighth issuer banks are displayed in the preference order determined by the first or second bot 220 or 320. Further, the first, fifth and eighth issuer banks are relevant to the user 102, as the user 102 had used the first, fifth and eighth issuer banks as payment options for performing e-commerce transactions during the first time-interval for a considerable number of times (i.e., more than the minimum frequency-of-use value). In a scenario, when the user 102 is not satisfied with the first set of payment options, the user 102 may provide the feedback by clicking on "more issuer banks" option presented on the fourth portion 414. In such a scenario, the first or second payment-interface manager 218 or 318 presents the first default payment interface 402 to the user 102 and monitors the purchase pattern again for the second time-interval to customize the first default payment interface 402.

Figure 5:
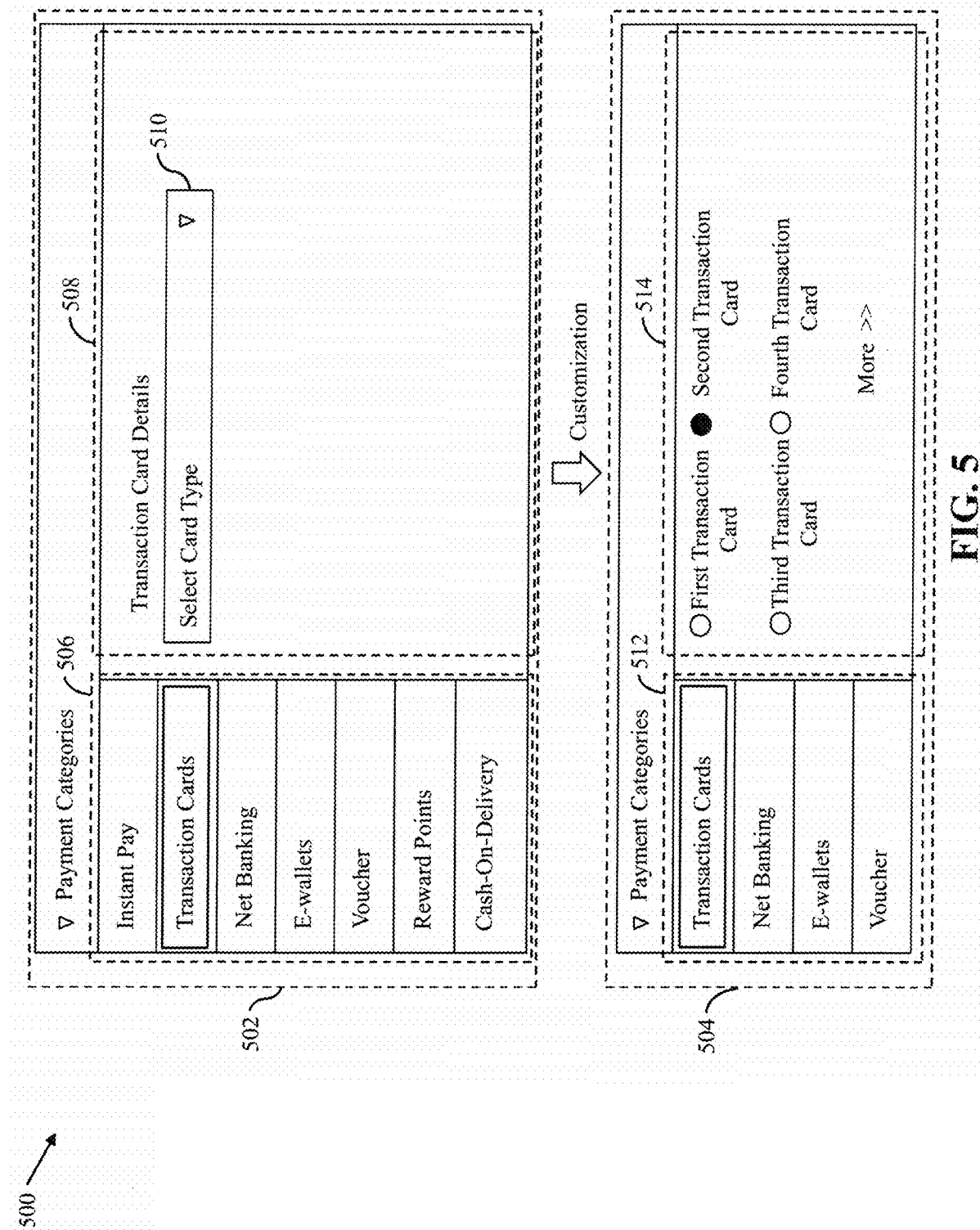
FIG. 5 is another exemplary scenario that illustrates a default payment interface and a customized payment interface, in accordance with an embodiment of the present invention.

FIG. 5 is another exemplary scenario 500 that illustrates a second default payment interface 502 and a second customized payment interface 504, in accordance with an embodiment of the present invention.

The second default payment interface 502 is similar to the first default payment interface 402 and is displayed to the user 102 within the first time-interval for performing e-commerce transactions. The second default payment interface 502 includes a fifth portion 506 and a sixth portion 508. The fifth portion 506 presents the available set of payment categories (such as instant pay, transaction cards, net-banking, e-wallets, vouchers, reward points, cash-on-delivery, and the like) to the user 102. The user 102 may select any payment category from the available set of categories. For example, the user 102 has selected the transaction card category presented in the fifth portion 506. The sixth portion 508 enables the user 102 to provide details of a transaction card that the user 102 wishes to use. The user 102 may provide the details of the transaction card by clicking on a select card type option 510. When the user 102 clicks on the select card type option 510, the user 102 is presented with a list of various card types that the user 102 can select. Based on the selection of the card type, the user 102 is prompted to provide credentials of the transaction card, which are not saved at the e-commerce interface, for performing the e-commerce transaction. A bot (such as the first or second bot 220 or 320) customizes the second default payment interface 502 based on the purchase pattern (such as the purchase pattern 222) and the user-profile of the user 102 as described in conjunction with FIGS. 2A and 3.

The second customized payment interface 504 is a GUI that is presented on the display of the user device 104, when the user 102 wishes to perform an e-commerce transaction after the first time-interval. The second customized payment interface 504 includes a seventh portion 512 and an eighth portion 514. The seventh portion 512 presents the first set of payment categories (such as transaction cards, net-banking, e-wallets, and vouchers) identified by the first or second bot 220 or 320 to the user 102. The user 102 may select any payment category from the first set of categories. For example, the user 102 has selected the transaction card category presented in the seventh portion 512. When the user 102 selects a payment category from the first set of categories, the corresponding first set of payment options is presented on the eighth portion 514. For example, the eighth portion 514 presents the first through fourth transaction cards as payment options to the user 102. The first through fourth transaction cards are displayed in the preference order determined by the first or second bot 220 or 320. Further, the first through fourth transaction cards are relevant to the user 102, as the user 102 had used the first through fourth transaction cards as payment options for performing e-commerce transactions during the first time-interval for a considerable number of times (i.e., more than the minimum frequency-of-use value). The first through fourth transaction cards are not saved by the user 102 at the e-commerce interface. Thus, the credentials of the first through fourth transaction cards in this scenario are secure. In a scenario, when the user 102 is not satisfied with the first set of payment options, the user 102 may provide the feedback by clicking on "more" option presented on the eighth portion 514. In such a scenario, the first or second payment-interface manager 218 or 318 presents the second default payment interface 502 to the user 102 and monitors the purchase pattern again for the second time-interval to customize the second default payment interface 502.

In another embodiment, when the user 102 selects the cash-on-delivery category included in the first set of payment categories, various delivery addresses (such as locations) of the user 102 are displayed in the eighth portion 514. The user 102 may have used the displayed delivery addresses for delivering products for a considerable number of time (i.e., more than the minimum frequency-of-use value) during the first time-interval.

It will be apparent to persons having ordinary skill in the art that the above-mentioned exemplary scenarios 400 and 500 are for illustrative purpose and should not be construed to limit the scope of the invention in any way.

Figure 6A:
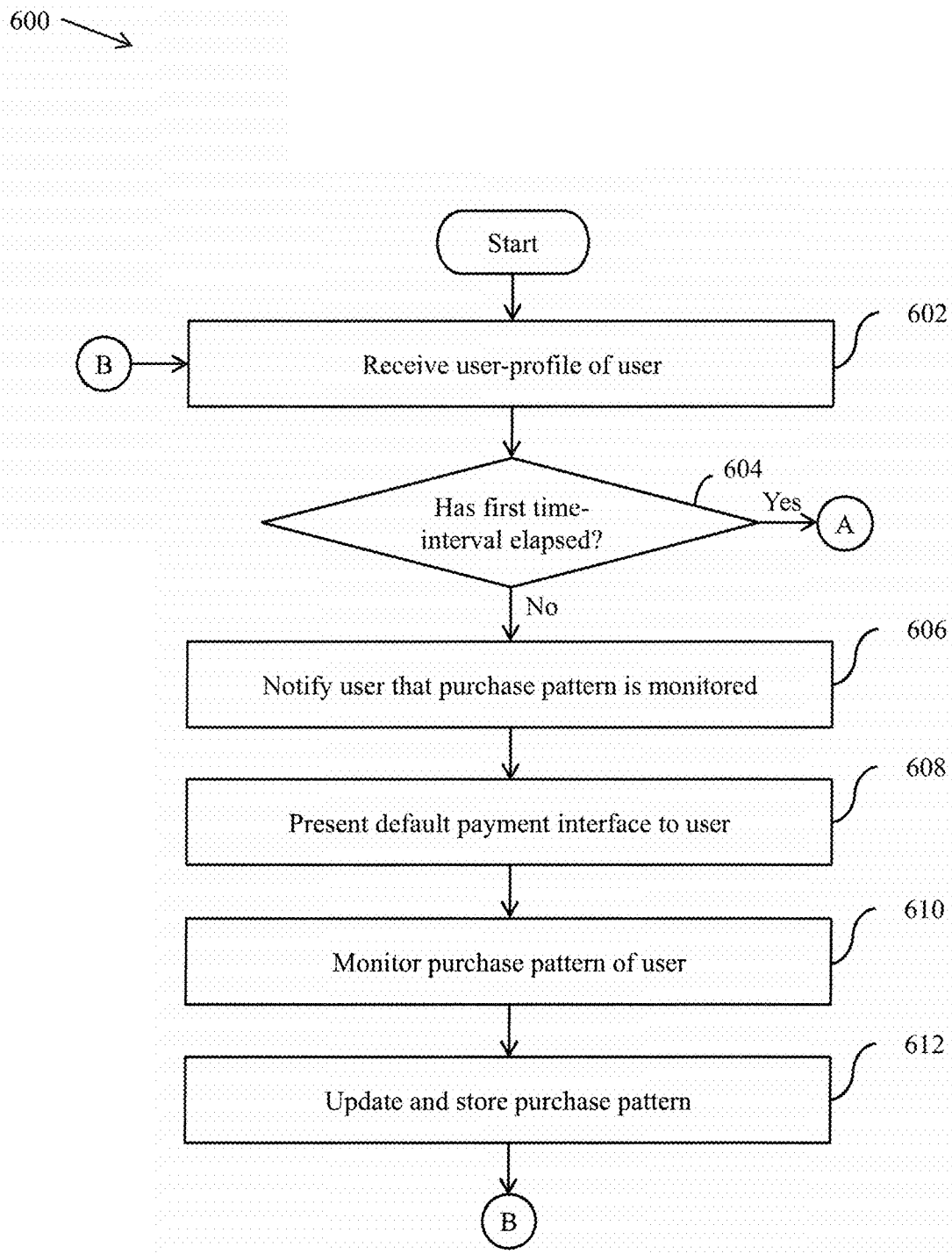
FIGS. 6A and 6B represent a flow chart that illustrates a method for customizing a default payment interface to facilitate e-commerce transactions, in accordance with another embodiment of the present invention.
Figure 6B:
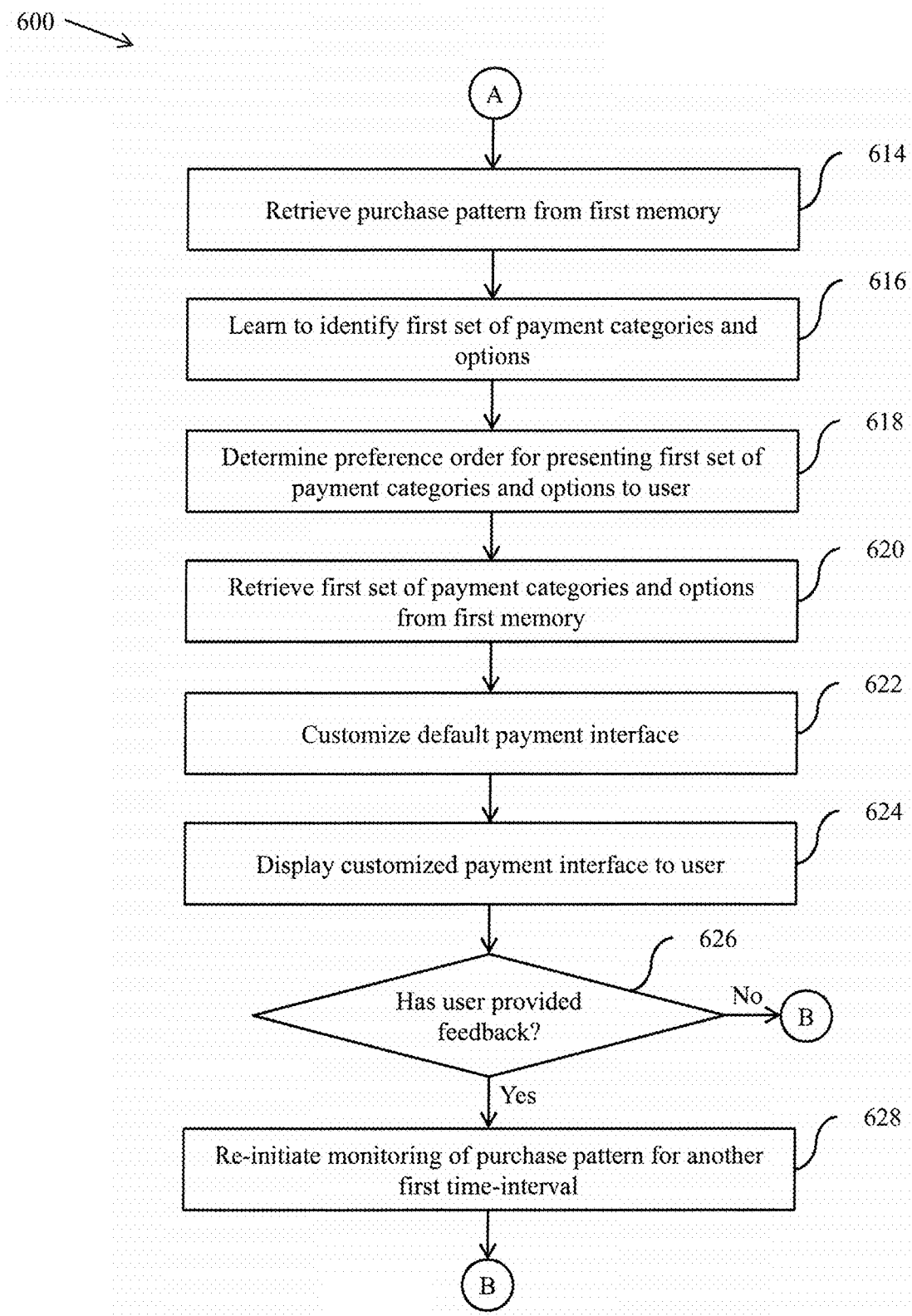

FIGS. 6A and 6B are a flow chart 600 that illustrates a method for customizing a default payment interface to facilitate e-commerce transactions, in accordance with another embodiment of the present invention. FIGS. 6A and 6B are explained in conjunction with FIGS. 1, 2A, and 2B. The user 102 logs in to an e-commerce interface of a merchant (such as the first or second merchant) by providing her login credentials. The user 102 selects a product to purchase from the e-commerce interface and wishes to perform an e-commerce transaction for purchasing the product. The e-commerce interface re-directs the control to the payment gateway 108 hosted by the first payment-gateway processor 204, based on the selection of the user 102.

At step 602, the first bot 220 receives the user-profile of the user 102 from a corresponding merchant server (such as the first or second merchant server 106A or 106B) associated with the e-commerce interface. At step 604, the first bot 220 determines whether the first time-interval has elapsed or not. If at step 604, the first bot 220 determines that the first time-interval has not elapsed, step 606 is performed. At step 606, the first bot 220 notifies the user 102 that the purchase pattern is being monitored by the first bot 220 as described in conjunction with FIG. 2A. In one scenario, if the user 102 does not provide a consent for monitoring the purchase pattern, the first bot 220 does not monitor the purchase pattern.

At step 608, the first payment-interface manager 218 presents the default payment interface (such as the first and second default payment interfaces 402 and 502) to the user 102 for performing the e-commerce transaction. The user 102 selects one or more payment categories from the available set of payment categories and one or more payment options from the available set of payment options that fall under the selected payment categories to perform the e-commerce transaction. The e-commerce transaction is then processed for approval or denial based on the authorization of the selected payment option and the authentication of the user 102 as described in conjunction with FIGS. 2A and 3.

At step 610, the first bot 220 monitors the purchase pattern of the user 102, based on the e-commerce transaction performed by the user 102 through the default payment interface. The monitoring of the purchase pattern is explained in detail in conjunction with FIGS. 2A and 3. At step 612, the first bot 220 stores the purchase pattern (such as the purchase pattern 222) in an encrypted format in the first memory 206. The first bot 220 repeats the above-mentioned steps for subsequent e-commerce transactions performed by the user 102 within the first time-interval and updates the purchase pattern (such as the purchase pattern 222).

If at step 604, the first bot 220 determines that the first time-interval has elapsed, step 614 is performed. At step 614, the first bot 220 retrieves the purchase pattern (such as the purchase pattern 222) from the first memory 206. At step 616, the first bot 220 learns to identify the first set of payment categories and options from the one or more payment categories and options based on the user-profile of the user 102 and the purchase pattern (such as the purchase pattern 222) of the user 102. The user 102 had used the one or more payment categories and options to perform e-commerce transactions during the first time-interval.

At step 618, the first bot 220 determines the preference order for presenting the first set of payment categories and options to the user 102. The first bot 220 determines the preference order based on the purchase pattern (such as the purchase pattern 222), one or more offers associated with the first set of payment options, and one or more rules specified by the user 102. At step 620, the first bot 220 retrieves the first set of payment categories and options from the first memory 206. At step 622, the first bot 220 customizes the default payment interface to display the first set of payment categories and options to the user 102. For customizing the default payment interface, the first bot 220 excludes the second set of payment categories and options from the available set of payment categories and options. The first set of payment categories and options correspond to the payment categories and options that remain after the first bot 220 excludes the second set of payment categories and options from the available set of payment categories and options.

At step 624, the first payment-interface manager 218 displays the customized payment interface (such as the first and second customized payment interfaces 404 and 504) to the user 102 for performing the e-commerce transaction. The first set of payment categories and options rendered by the customized payment interface are selectable by the user 102 for performing the e-commerce transaction. The user 102 may select one or more payment categories from the first set of payment categories and one or more payment options from the first set of payment options that fall under the selected payment categories to perform the e-commerce transaction. The e-commerce transaction is then processed for approval or denial based on the authorization of the selected payment option and the authentication of the user 102.

At step 626, the first bot 220 determines whether the user 102 has provided any feedback for the customized payment interface. If at step 626, the first bot 220 determines that the user 102 has provided a feedback, step 628 is performed. At step 628, the first bot 220 re-initiates the monitoring of the purchase pattern for another first time-interval and the control passes to step 602 for facilitating subsequent e-commerce transactions that are performed within the other first time-interval. Thus, the first bot 220 re-monitors the purchase pattern of the user 102 for another first time-interval. During the other first time-interval, the first bot 220 re-learns to identify a third set of payment categories and options based on the user-profile and the purchase pattern that is re-monitored, for customizing the default payment interface. Hence, the first bot 220 customizes the default payment interface based on the purchase pattern that is re-monitored and the third set of payment categories and options, when the user 102 makes a purchase after the other first time-interval.

If at step 626, the first bot 220 determines that the user 102 has not provided the feedback, step 602 is performed. Thus, the first payment-interface manager 218 continues to present the customized payment interface to the user 102 based on the purchase pattern and the user-profile. Since the first bot 220 updates the purchase pattern after every e-commerce transaction, the relevance of the customized payment interface continues to improve.

Figure 7A:
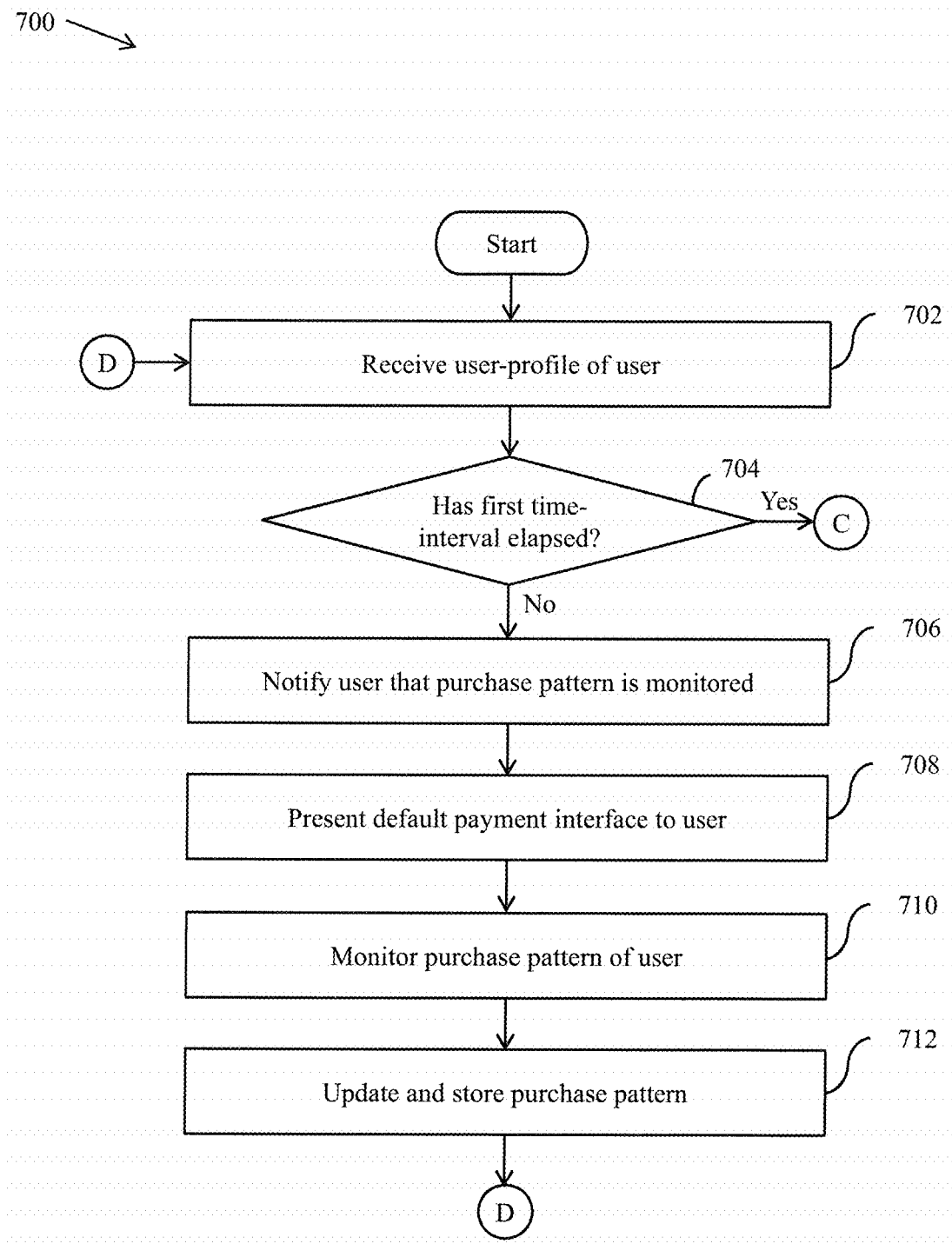
FIGS. 7A and 7B represent a flow chart that illustrates a method for customizing a default payment interface to facilitate e-commerce transactions, in accordance with another embodiment of the present invention.
Figure 7B:
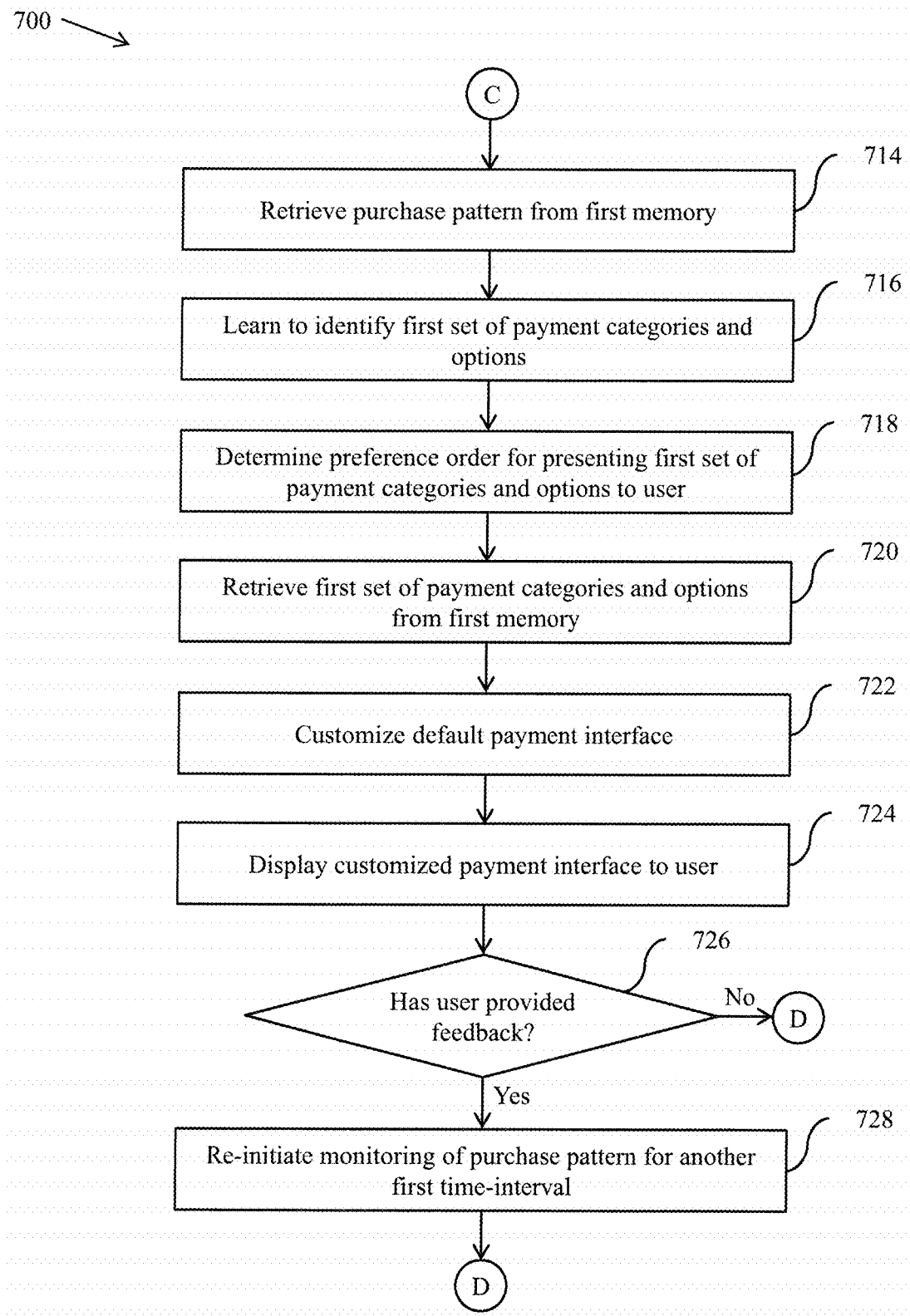

FIGS. 7A and 7B are a flow chart 700 that illustrates a method for customizing a default payment interface to facilitate e-commerce transactions, in accordance with another embodiment of the present invention. FIGS. 7A and 7B are explained in conjunction with FIGS. 1 and 3. The user 102 logs in to an e-commerce interface of a merchant (such as the first or second merchant) by providing her login credentials. The user 102 selects a product to purchase from the e-commerce interface and wishes to perform an e-commerce transaction for purchasing the product. The e-commerce interface re-directs the control to the payment gateway 108 hosted by the second payment-gateway processor 304 based on the selection of the user 102.

At step 702, the second bot 320 receives the user-profile of the user 102 from a corresponding merchant server (such as the first or second merchant server 106A or 106B) associated with the e-commerce interface. At step 704, the second bot 320 determines whether the first time-interval has elapsed or not. If at step 704, the second bot 320 determines that the first time-interval has not elapsed, step 706 is performed. At step 706, the second bot 320 notifies the user 102 that the purchase pattern is being monitored by the second bot 320. In one scenario, if the user 102 does not provide a consent for monitoring the purchase pattern, the second bot 320 does not monitor the purchase pattern.

At step 708, the second payment-interface manager 318 presents the default payment interface (such as the first and second default payment interfaces 402 and 502) to the user 102 for performing the e-commerce transaction. The user 102 selects one or more payment categories from the available set of payment categories and one or more payment options from the available set of payment options that fall under the selected payment categories to perform the e-commerce transaction. The e-commerce transaction is then processed for approval or denial based on the authorization of the selected payment option/s and the authentication of the user 102.

At step 710, the second bot 320 monitors the purchase pattern of the user 102 based on the e-commerce transaction performed by the user 102 from the default payment interface. The monitoring of the purchase pattern is explained in detail in conjunction with FIG. 3. At step 712, the second bot 320 stores the purchase pattern (such as the purchase pattern 222) in the second memory 306. The second bot 320 repeats the above-mentioned steps for subsequent e-commerce transactions performed by the user 102 within the first time-interval and updates the purchase pattern (such as the purchase pattern 222).

If at step 704, the second bot 320 determines that the first time-interval has elapsed, step 714 is performed. At step 714, the second bot 320 retrieves the purchase pattern (such as the purchase pattern 222) from the second memory 306. At step 716, the second bot 320 learns to identify the first set of payment categories and options from the one or more payment categories and options based on the user-profile of the user 102 and the purchase pattern of the user 102. The user 102 had used the one or more payment categories and options to perform e-commerce transactions within the first time-interval.

At step 718, the second bot 320 determines the preference order for presenting the first set of payment categories and options to the user 102. The second bot 320 determines the preference order based on the purchase pattern, one or more offers associated with the first set of payment options, and one or more rules specified by the user 102. At step 720, the second bot 320 retrieves the first set of payment categories and options from the second memory 306. At step 722, the second bot 320 customizes the default payment interface to display the first set of payment categories and options to the user 102. For customizing the default payment interface, the second bot 320 excludes the second set of payment categories and options from the available set of payment categories and options.

At step 724, the second payment-interface manager 318 displays the customized payment interface (such as the first and second customized payment interfaces 404 and 504) to the user 102 for performing the e-commerce transaction. The first set of payment categories and options rendered by the customized payment interface are selectable by the user 102 for performing the e-commerce transaction. The user 102 may select at least one payment category from the first set of payment categories and at least one payment option from the first set of payment options that falls under the selected payment category to perform the e-commerce transaction. The e-commerce transaction is then processed for approval or denial based on the authorization of the selected payment option and the authentication of the user 102.

At step 726, the second bot 320 determines whether the user 102 has provided any feedback for the customized payment interface. If at step 726, the second bot 320 determines that the user 102 has provided a feedback, step 728 is performed. At step 728, the second bot 320 re-initiates the monitoring of the purchase pattern for another first time-interval and the control passes to step 702 for facilitating subsequent e-commerce transactions that are performed within the other first time-interval. Thus, the second bot 320 re-monitors the purchase pattern of the user 102 for another first time-interval. During the other first time-interval, the second bot 320 re-learns to identify the third set of payment categories and options based on the user-profile and the purchase pattern that is re-monitored for customizing the default payment interface. Hence, the second bot 320 customizes the default payment interface based on the purchase pattern that is re-monitored and the third set of payment categories and options, when the user 102 makes a purchase after the other first time-interval.

If at step 726, the second bot 320 determines that the user 102 has not provided the feedback, step 702 is performed. Thus, the second payment-interface manager 318 continues to present the customized payment interface to the user 102 based on the purchase pattern and the user-profile.

It will be apparent to a person skilled in the art that the scope of the invention is not limited to the payment network server 112 or the issuer server 114 hosting the payment gateway 108 and performing the above-mentioned steps. In another embodiment, the merchant servers 106 or any third-party payment gateway server (not shown) may perform the above-mentioned steps without departing from the spirit of the invention.

Figure 8:
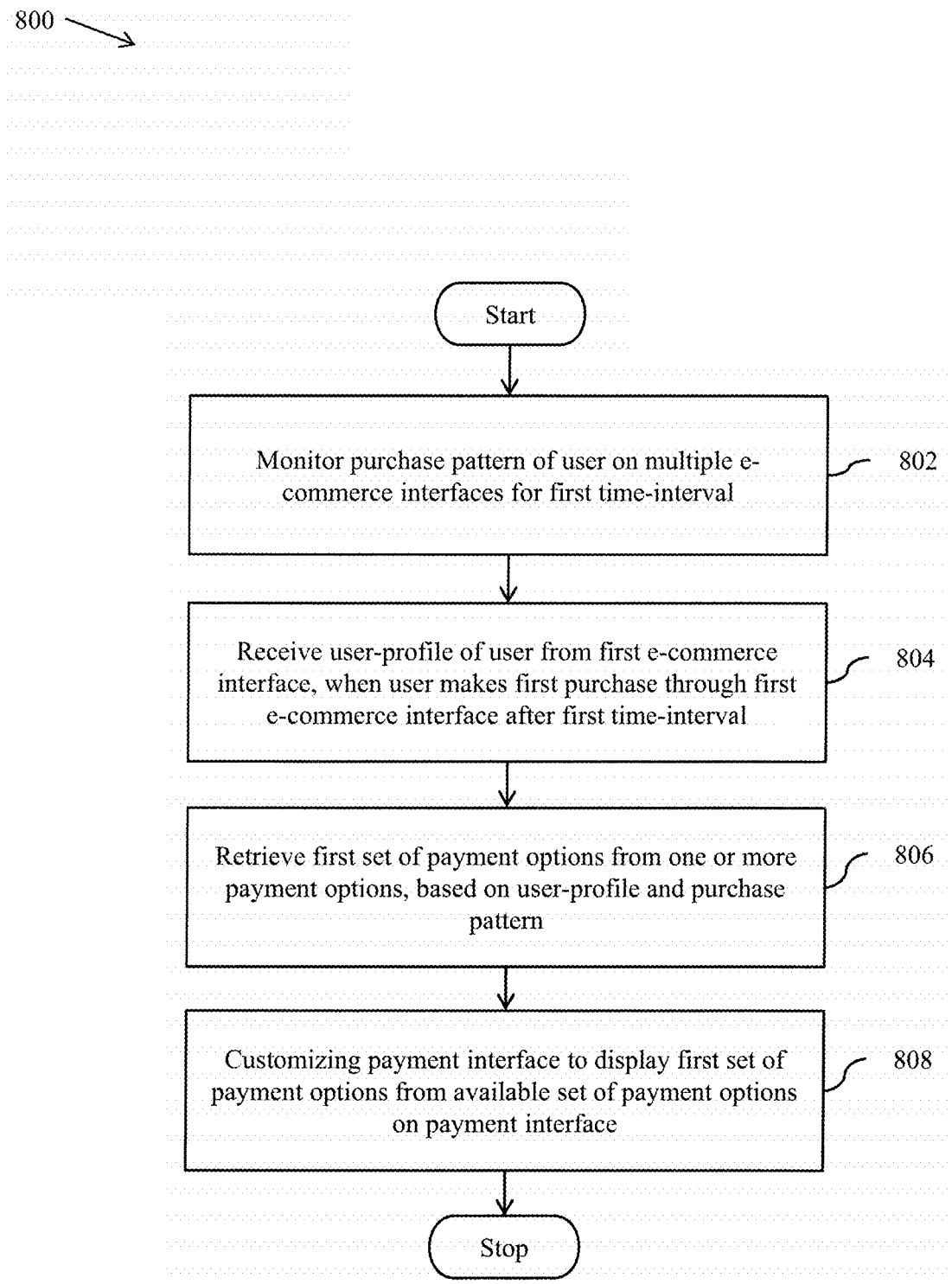
FIG. 8 represents a high-level flow chart that illustrates a method for facilitating e-commerce transactions, in accordance with an embodiment of the present invention.

FIG. 8 is a high-level flow chart 800 that illustrates a method for facilitating e-commerce transactions, in accordance with an embodiment of the present invention. The user 102 logs into various e-commerce interfaces (such as e-commerce mobile applications or e-commerce websites) of merchants (such as the first or second merchant) by providing her login credentials. The user 102 selects products to purchase from the e-commerce interfaces and wishes to perform e-commerce transactions for purchasing the products during a first time-interval. Each e-commerce interface re-directs the control to the payment gateway 108 hosted by a payment-gateway processor (such as the first or second payment-gateway processor 204 or 304) based on the selection of the user 102. In one embodiment, the payment-gateway processor may be implemented by a merchant server (such as the merchant servers 106) or any third-party payment gateway server.

At step 802, a bot (such as the first or second bot 220 or 320) implemented on the payment-gateway processor monitors the purchase pattern of the user 102 on the e-commerce interfaces for the first time-interval (as described in conjunction with FIGS. 2A and 3). The purchase pattern includes the frequency-of-use information (such as the frequency-of-use information 224) of one or more payment options used by the user 102 to make the purchases on the e-commerce interfaces within the first time-interval.

At step 804, the bot (such as the first or second bot 220 or 320) receives the user-profile of the user 102 from the first e-commerce interface, when the user 102 makes the first purchase through the first e-commerce interface after the first time-interval. At step 806, the bot retrieves the first set of payment options from the one or more payment options, based on the user-profile and the purchase pattern (as described in conjunction with FIGS. 2A and 3).

At step 808, the bot (such as the first or second bot 220 or 320) customizes the default payment interface to display the first set of payment options from the available set of payment options on the default payment interface (as described in conjunction with FIGS. 2A and 3). The first set of payment options displayed on the payment interface is selectable by the user 102 to perform the e-commerce transaction for the first purchase.

Figure 9:
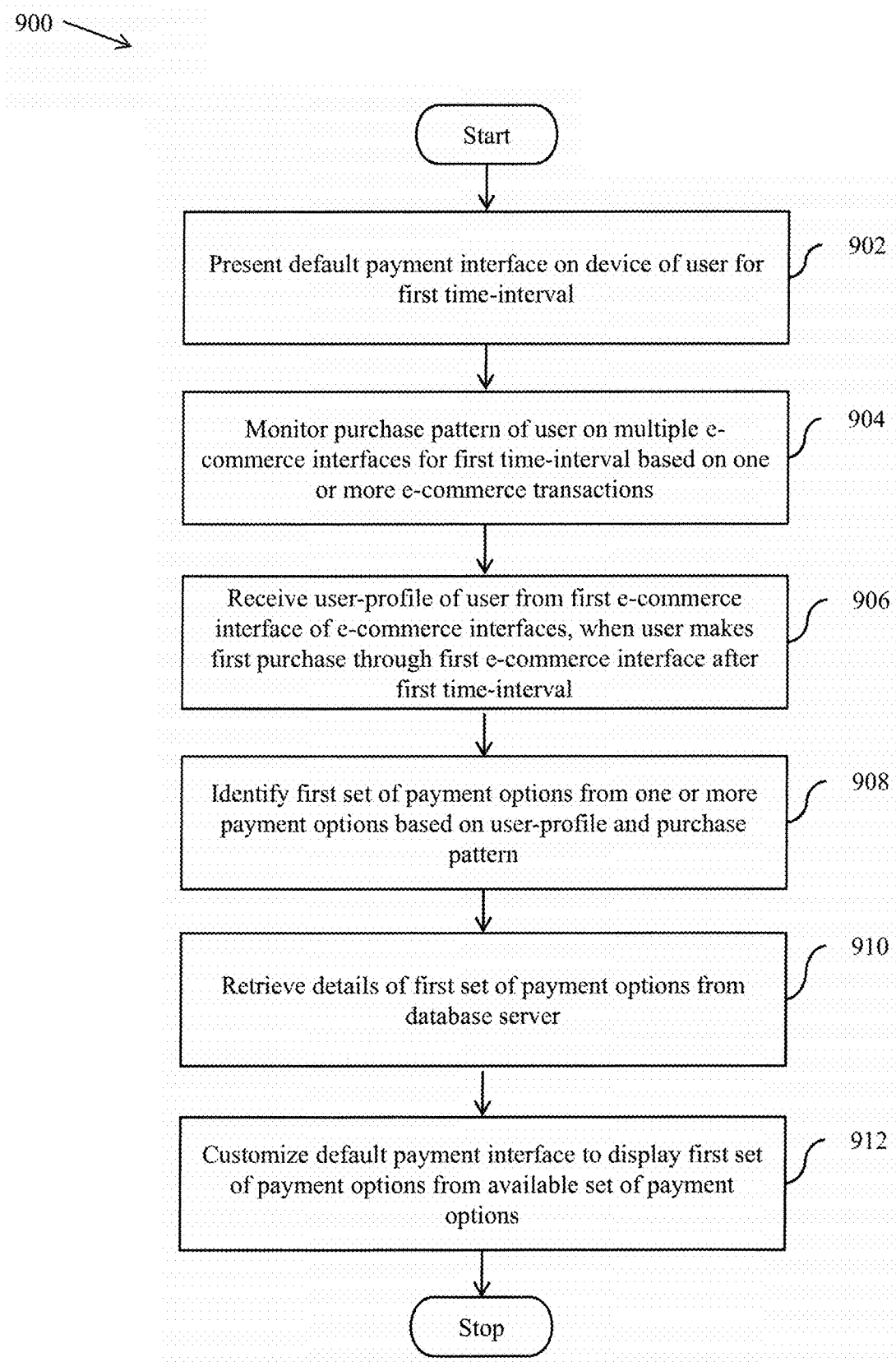
FIG. 9 represents a high-level flow chart that illustrates a method for facilitating e-commerce transactions, in accordance with another embodiment of the present invention.

FIG. 9 is a high-level flow chart 900 that illustrates a method for facilitating e-commerce transactions, in accordance with an embodiment of the present invention. The user 102 logs in to one or more e-commerce interfaces (such as e-commerce mobile applications or e-commerce websites) of merchants (such as the first or second merchant) by providing her login credentials. The user 102 selects products to purchase from the e-commerce interfaces and wishes to perform one or more e-commerce transactions for purchasing the products within the first time-interval. The e-commerce interfaces re-direct the control to the payment gateway 108 hosted by a payment-gateway processor (such as the first or second payment-gateway processor 204 or 304) based on the selection of the user 102. In one embodiment, the payment-gateway processor may be implemented by a merchant server (such as the merchant servers 106) or any third-party payment gateway server.

At step 902, the payment-gateway processor (such as the first or second payment-gateway processor 204 or 304) presents a default payment interface on the user device 102 for the first time-interval. The default payment interface enables the user to perform the one or more e-commerce transactions for making one or more purchases from the one or more e-commerce interfaces. The user 102 uses one or more payment options from the available set of payment options on the default payment interface for performing the one or more e-commerce transactions. At step 904, a bot (such as the first or second bot 220 or 320) implemented on the payment-gateway processor monitors the purchase pattern of the user 102 on the e-commerce interfaces for the first time-interval (as described in conjunction with FIGS. 2A and 3) based on the one or more e-commerce transactions. The purchase pattern (such as the purchase pattern 222) includes the frequency-of-use information (such as the frequency-of-use information 224) of the one or more payment options.

At step 906, the bot (such as the first or second bot 220 or 320) receives the user-profile of the user 102 from a first e-commerce interface of the one or more e-commerce interfaces, when the user 102 makes a first purchase through the first e-commerce interface after the first time-interval. At step 908, the bot (such as the first or second bot 220 or 320) identifies the first set of payment options from the one or more payment options based on the user-profile and the purchase pattern. At step 910, the bot (such as the first or second bot 220 or 320) retrieves details of the first set of payment options from a database server, such as the first and second memories 206 or 306 (as described in conjunction with FIGS. 2A and 3). At step 912, the bot (such as the first or second bot 220 or 320) customizes the default payment interface to display the first set of payment options. The bot (such as the first or second bot 220 or 320) excludes the third set of payment options from the available set of payment options for displaying the first set of payment options. The first set of payment options displayed on the customized payment interface is selectable by the user 102 to perform the e-commerce transaction for the first purchase.

Figure 10:
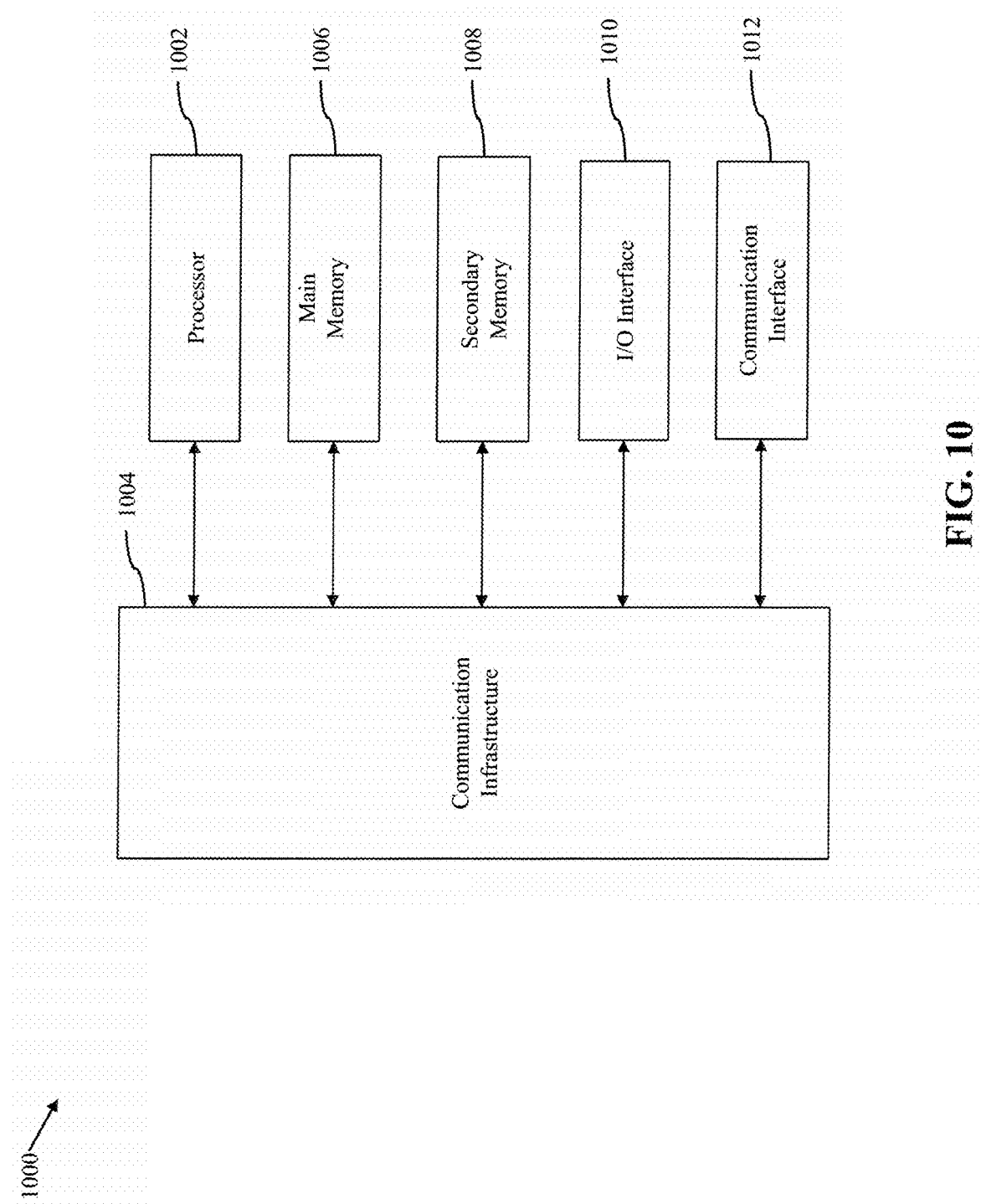
FIG. 10 is a block diagram that illustrates system architecture of a computer system, in accordance with an embodiment of the present invention.

FIG. 10 is a block diagram that illustrates system architecture of a computer system 1000, in accordance with an embodiment of the present invention. An embodiment of present invention, or portions thereof, may be implemented as computer readable code on the computer system 1000. In one example, the user device 104, the merchant servers 106, the acquirer server 110, the payment network server 112, and the issuer server 114 of FIG. 1 may be implemented in the computer system 1000 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 6A and 6B, FIGS. 7A and 7B, FIGS. 8 and 9.

The computer system 1000 includes a processor 1002 that may be a special-purpose or a general-purpose processing device. The processor 1002 may be a single processor, multiple processors, or combinations thereof. The processor 1002 may have one or more processor cores. In one example, the processor 1002 is an octa-core processor. Further, the processor 1002 may be connected to a communication infrastructure 1004, such as a bus, i.e., the first and second buses 210 and 310, message queue, multi-core message-passing scheme, and the like. The computer system 1000 may further include a main memory 1006 and a secondary memory 1008. Examples of the main memory 1006 may include RAM, ROM, and the like. In one embodiment, the main memory 1006 is the first and second memories 206 and 306. The secondary memory 1008 may include a hard disk drive or a removable storage drive, such as a floppy disk drive, a magnetic tape drive, a compact disc, an optical disk drive, a flash memory, and the like. Further, the removable storage drive may read from and/or write to a removable storage device in a manner known in the art. In one example, if the removable storage drive is a compact disc drive, the removable storage device may be a compact disc. In an embodiment, the removable storage unit may be a non-transitory computer readable storage media.

The computer system 1000 further includes an input/output (I/O) interface 1010 and a communication interface 1012. The I/O interface 1010 includes various input and output devices that are configured to communicate with the processor 1002. Examples of the input devices may include a keyboard, a mouse, a joystick, a touchscreen, a microphone, and the like. Examples of the output devices may include a display screen, a speaker, headphones, and the like. The communications interface 1012 may be configured to allow data to be transferred between the computer system 1000 and various devices that are communicatively coupled to the computer system 1000. Examples of the communications interface 1012 may include a modem, a network interface, i.e., an Ethernet card, a communications port, and the like. Data transferred via the communications interface 1012 may correspond to signals, such as electronic, electromagnetic, optical, or other signals as will be apparent to a person skilled in the art. The signals may travel via a communications channel (not shown) which may be configured to transmit the signals to devices that are communicatively coupled to the computer system 1000. Examples of the communications channel may include, but are not limited to, cable, fiber optics, a phone line, a cellular phone link, a radio frequency link, and the like.

Computer program medium and computer usable medium may refer to memories, such as the main memory 1006 and the secondary memory 1008, which may be a semiconductor memory such as a DRAM. These computer program mediums may provide data that enables the computer system 1000 to implement the methods illustrated in FIGS. 6A and 6B, FIGS. 7A and 7B, FIG. 8, and FIG. 9. In an embodiment, the present invention is implemented using a computer implemented application, the computer implemented application may be stored in a computer program product and loaded into the computer system 1000 using the removable storage drive or the hard disc drive in the secondary memory 1008, the I/O interface 1010, or communications interface 1012.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor such as the processor 1002 and a memory such as the main memory 1006 and the secondary memory 1008 implements the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Since the first or second bot 220 or 320 automatically customizes a default payment interface for various users based on a purchase pattern and a user-profile of the corresponding user, the customized payment interface includes only those payment categories and options that are relevant to the corresponding user. Thus, the customized payment interface is different for different users. Therefore, the users are saved from the inconvenience of scanning through all the payment categories and options listed on the default payment interface for identifying a relevant payment category and option. The purchase pattern is stored in an encrypted format in the first or second memories 206 or 306 for ensuring data security to the user 102. In addition to data security, the first or second bot 220 or 320 eliminates the requirement to save confidential information of various payment options at every e-commerce interface. This is because the first or second bot 220 or 320 retrieves the purchase pattern including the information of various payment options relevant to the user 102, when the user 102 wishes to perform any e-commerce transaction. In other words, the first or second bot 220 or 320 improves the shopping experience of the user 102 by eliminating information of payment categories and options that are not relevant to the user 102.

Techniques consistent with the present invention provide, among other features, systems and methods for facilitating e-commerce transactions. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A method for facilitating e-commerce transactions, comprising:
    monitoring, by a bot implemented on a processor, a purchase pattern of a user on at least one e-commerce interface for a first time-interval, wherein the purchase pattern includes frequency-of-use information of a first set of payment options used by the user to make a plurality of purchases on the at least one e-commerce interface within the first time-interval, wherein a length of the first time-interval is dynamically determined based on how often the user shops;
    in response to the user making a first purchase through the at least one e-commerce interface after the first time-interval, receiving, by the bot on the processor, a user-profile of the user from a first e-commerce interface of the at least one e-commerce interface;
    determining, by the bot on the processor, a second set of payment options that excludes at least one payment option of the first set of payment options by:
        for each payment option of the first set of payment options, determining whether or not that payment option exceeds the minimum frequency-of-use value from the frequency-of-use information of the purchase pattern;
        including each payment option that does exceed the minimum frequency-of-use information of the purchase pattern in the second set of payment options; and
        excluding each payment option that does not exceed the minimum frequency-of-use information of the purchase pattern from the second set of payment options; and
    customizing, by the bot on the processor, a payment interface by displaying the second set of payment options on the payment interface, wherein the second set of payment options displayed on the payment interface is selectable by the user to perform an e-commerce transaction for the first purchase.

2. The method of claim 1, wherein the purchase pattern further includes contact information of the user, device information of a device used by the user to make the plurality of purchases, real-time location information of the user associated with the plurality of purchases, information of the first set of payment options, and spend-range information associated with the plurality of purchases.

3. The method of claim 1, wherein the bot retrieves the second set of payment options with respect to the first purchase and a third set of payment options with respect to a second purchase through a second e-commerce interface of the at least one e-commerce interface, and wherein the second set of payment options is different from the third set of payment options.

4. The method of claim 1, wherein the bot retrieves the second set of payment options, when the user accesses the first e-commerce interface by way of a first device for making the first purchase and a third set of payment options, when the user accesses the first e-commerce interface by way of a second device for making a second purchase, and wherein the second set of payment options is different from the third set of payment options.

5. The method of claim 1, wherein the bot retrieves the second set of payment options when the user accesses the first e-commerce interface from a first location for making the first purchase and a third set of payment options, when the user accesses the first e-commerce interface from a second location for making a second purchase, and wherein the second set of payment options is different from the third set of payment options.

6. The method of claim 1, wherein the bot retrieves the second set of payment options for the first purchase having a first purchase amount and a third set of payment options for a second purchase that is made through the first e-commerce interface and has a second purchase amount, wherein the second set of payment options is different from the third set of payment options, when the first purchase amount and the second purchase amount are different.

7. The method of claim 1, further comprising determining, by the bot, a preference order for the display of the second set of payment options on the payment interface based on at least one of the purchase pattern, at least one offer associated with the second set of payment options, and at least one user preference.

8. The method of claim 1, further comprising learning, by the bot, to identify the second set of payment options from the first payment options based on the user-profile and the purchase pattern.

9. The method of claim 1, further comprising receiving, by the bot, a feedback from the user to display the first set of payment options on the payment interface when the second set of payment options is displayed.

10. The method of claim 9, further comprising:
    re-monitoring, by the bot, the purchase pattern of the user on the at least one e-commerce interface for a second time-interval based on the feedback; and
    re-learning, by the bot, to identify a third set of payment options from the first set of payment options, based on the user-profile and the purchase pattern that is re-monitored, wherein the third set of payment options is displayed on the payment interface when the user makes a third purchase through the first e-commerce interface after the second time-interval, and wherein the third set of payment options is different from the second set of payment options.

11. The method of claim 1, wherein the dynamic determination of how often the user shops results in the first time-interval being shorter for the user compared to a second time-interval for a second user when the user shops more often than the second user.

12. A system for facilitating e-commerce transactions, comprising:
    a payment-gateway processor having a bot implemented thereon, wherein the bot is configured to:

monitor a purchase pattern of a user on at least one e-commerce interface for a first time-interval, wherein the purchase pattern includes frequency-of-use information of a first set of payment options used by the user to make a plurality of purchases on the at least one e-commerce interface within the first time-interval, wherein a length of the first time-interval is dynamically determined based on how often the user shops;

in response to the user making a first purchase through the at least one e-commerce interface after the first time-interval, receive a user-profile of the user from a first e-commerce interface of the at least one e-commerce interface;

determine a second set of payment options that excludes at least one payment option of the first set of payment options by:
  for each payment option of the first set of payment options, determining whether or not that payment option exceeds the minimum frequency-of-use value from the frequency-of-use information of the purchase pattern;
  including each payment option that does exceed the minimum frequency-of-use information of the purchase pattern in the second set of payment options; and
  excluding each payment option that does not exceed the minimum frequency-of-use information of the purchase pattern from the second set of payment options; and customize a payment interface by displaying the second set of payment options on the payment interface, wherein the second set of payment options displayed on the payment interface is selectable by the user to perform an e-commerce transaction for the first purchase.

13. The system of claim 12, wherein the bot is further configured to determine a preference order for the display of the second set of payment options on the payment interface based on at least one of the purchase pattern, at least one offer associated with the first set of payment options, and at least one user preference.

14. The system of claim 12, wherein the bot is further configured to learn to identify the second set of payment options from the first set of payment options based on the user-profile and the purchase pattern.

15. The system of claim 12, wherein the bot is further configured to receive a feedback from the user to display the first set of payment options on the payment interface when the second set of payment options is displayed.

16. The system of claim 15, wherein the bot is further configured to:
  re-monitor the purchase pattern of the user on the at least one e-commerce interface for a second time-interval based on the feedback; and
  re-learn to identify a third set of payment options from the first set of payment options, based on the user-profile and the purchase pattern that is re-monitored, wherein the third set of payment options is displayed on the payment interface when the user makes a second purchase through the first e-commerce interface after the second time-interval, and wherein the third set of payment options is different from the second set of payment options.

17. The system of claim 12, wherein the purchase pattern further includes contact information of the user, device information of a device used by the user to make the plurality of purchases, real-time location information of the user associated with the plurality of purchases, information of the first set of payment options, and spend-range information associated with the plurality of purchases.

18. The system of claim 12, wherein the payment-gateway processor is implemented by one of an issuer server, a payment network server, a merchant server, and a payment gateway server.

19. A method for facilitating e-commerce transactions, comprising:
  presenting, by a payment gateway processor, a default payment interface on a device of a user for a first time-interval, wherein the default payment interface enables the user to perform a plurality of e-commerce transactions for making a plurality of purchases from at least one e-commerce interface, and wherein the user uses at least one payment option from a first set of payment options on the default payment interface for performing the plurality of e-commerce transactions;
  monitoring, by a bot implemented on the payment gateway processor, a purchase pattern of the user on the at least one e-commerce interface for the first time-interval based on the plurality of e-commerce transactions, wherein the purchase pattern includes frequency-of-use information of the at least one payment option, wherein a length of the first time-interval is dynamically determined based on how often the user shops;
  in response to the user making a first purchase through the at least one e-commerce interface after the first time-interval, receiving, by the bot implemented on the payment gateway processor, a user-profile of the user from a first e-commerce interface of the at least one e-commerce interface;
  determining, by the bot implemented on the payment gateway processor, a second set of payment options that excludes at least one payment option of the first set of payment options by:
    for each payment option of the first set of payment options, determining whether or not that payment option exceeds the minimum frequency-of-use value from the frequency-of-use information of the purchase pattern;
    including each payment option that does exceed the minimum frequency-of-use information of the purchase pattern in the second set of payment options; and
    excluding each payment option that does not exceed the minimum frequency-of-use information of the purchase pattern from the second set of payment options; and
  customizing, by the bot implemented on the payment gateway processor, the default payment interface by displaying the second set of payment options in a customized payment interface, wherein the first set of payment options displayed on the customized payment interface is selectable by the user to perform a first e-commerce transaction for the first purchase.

20. The method of claim 19, further comprising:
  updating, by the bot, the purchase pattern of the user based on the first purchase, wherein the second set of payment options for a second purchase made by the user is based on the user-profile and the updated purchase pattern.

* * * * *